United States Patent
Douglass et al.

(10) Patent No.: US 12,511,314 B2
(45) Date of Patent: *Dec. 30, 2025

(54) TRANSACTIONAL SHARDING OF BLOCKCHAIN TRANSACTIONS

(71) Applicant: Inveniam Capital Partners, Inc., New York, NY (US)

(72) Inventors: Clay Douglass, Austin, TX (US); Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/660,962

(22) Filed: May 10, 2024

(65) Prior Publication Data

US 2024/0296171 A1   Sep. 5, 2024

Related U.S. Application Data

(63) Continuation of application No. 16/116,991, filed on Aug. 30, 2018, now Pat. No. 11,989,208.
(Continued)

(51) Int. Cl.
*G06Q 20/06* (2012.01)
*G06F 16/182* (2019.01)
(Continued)

(52) U.S. Cl.
CPC .......... *G06F 16/278* (2019.01); *G06F 16/182* (2019.01); *G06F 16/27* (2019.01);
(Continued)

(58) Field of Classification Search
CPC ...... G06F 16/278; G06F 16/182; G06F 16/27; G06Q 20/065; G06Q 20/401; G06Q 20/02;
(Continued)

(56) References Cited

U.S. PATENT DOCUMENTS

| | | |
|---|---|---|
| 4,309,569 A | 1/1982 | Merkle |
| 5,499,294 A | 3/1996 | Friedman |

(Continued)

FOREIGN PATENT DOCUMENTS

| | | |
|---|---|---|
| CN | 107392618 A | 11/2017 |
| CN | 110392052 A | 10/2019 |

(Continued)

OTHER PUBLICATIONS

Eleftherios Kokoris-Kogias, OmniLedger: A Secure, Scale-Out, Decentralized Ledger via Sharding, Jul. 2018, IEEE, https://ieeexplore.ieee.org/stamp/stamp.jsp?tp=&arnumber=8418625 (Year: 2018).*

(Continued)

*Primary Examiner* — Chunling Ding
(74) *Attorney, Agent, or Firm* — Koffsky Schwalb LLC

(57) ABSTRACT

A complex cryptographic coinage transaction is transactionally sharded into multiple simple cryptographic coinage transactions. The complex cryptographic coinage transaction specifies cryptographic debits and/or deposits to/from multiple input accounts and/or multiple output accounts. The simple cryptographic coinage transactions, however, only specify a single one of the input accounts and/or a single one of the output accounts. A single server within a blockchain environment may thus process one of the simple cryptographic coinage transactions without requiring calls for data from other servers responsible for other accounts.

12 Claims, 34 Drawing Sheets

Related U.S. Application Data

(60) Provisional application No. 62/714,909, filed on Aug. 6, 2018, provisional application No. 62/714,911, filed on Aug. 6, 2018.

(51) Int. Cl.
*G06F 16/27* (2019.01)
*G06Q 20/40* (2012.01)
*H04L 9/06* (2006.01)
*H04L 9/00* (2022.01)

(52) U.S. Cl.
CPC ......... *G06Q 20/065* (2013.01); *G06Q 20/401* (2013.01); *H04L 9/0643* (2013.01); *H04L 9/50* (2022.05); *H04L 2209/56* (2013.01)

(58) Field of Classification Search
CPC ........... G06Q 2220/00; G06Q 20/3678; G06Q 20/382; H04L 9/0643; H04L 9/50; H04L 2209/56; H04L 9/3239
See application file for complete search history.

(56) References Cited

U.S. PATENT DOCUMENTS

| | | |
|---|---|---|
| 5,606,609 A | 2/1997 | Houser |
| 5,862,218 A | 1/1999 | Steinberg |
| 5,920,629 A | 7/1999 | Rosen |
| 5,966,446 A | 10/1999 | Davis |
| 6,363,481 B1 | 3/2002 | Hardjono |
| 7,028,263 B2 | 4/2006 | Maguire |
| 7,212,808 B2 | 5/2007 | Engstrom |
| 7,272,179 B2 | 9/2007 | Siemens |
| 7,572,179 B2 | 8/2009 | Choi |
| 7,729,950 B2 | 6/2010 | Mendizabal |
| 7,730,113 B1 | 6/2010 | Payette |
| 8,245,038 B2 | 8/2012 | Golle |
| 8,266,439 B2 | 9/2012 | Haber |
| 8,359,361 B2 | 1/2013 | Thornton |
| 8,442,903 B2 | 5/2013 | Zadoorian |
| 8,560,722 B2 | 10/2013 | Gates |
| 8,612,477 B2 | 12/2013 | Becker |
| 8,706,616 B1 | 4/2014 | Flynn |
| 8,712,887 B2 | 4/2014 | Degroeve |
| 8,867,741 B2 | 10/2014 | Mccorkindale |
| 8,943,332 B2 | 1/2015 | Horne |
| 8,990,322 B2 | 3/2015 | Cai |
| 9,124,423 B2 | 9/2015 | Jennas, II |
| 9,325,653 B1 | 4/2016 | Peterson |
| 9,378,343 B1 | 6/2016 | David |
| 9,396,006 B2 | 7/2016 | Kundu |
| 9,398,018 B2 | 7/2016 | Macgregor |
| 9,407,431 B2 | 8/2016 | Bellare |
| 9,411,524 B2 | 8/2016 | O'Hare |
| 9,411,976 B2 | 8/2016 | Irvine |
| 9,411,982 B1 | 8/2016 | Dippenaar |
| 9,424,576 B2 | 8/2016 | Vandervort |
| 9,436,923 B1 | 9/2016 | Sriram |
| 9,436,935 B2 | 9/2016 | Hudon |
| 9,472,069 B2 | 10/2016 | Roskowski |
| 9,489,827 B2 | 11/2016 | Quinn |
| 9,584,493 B1 | 2/2017 | Leavy |
| 9,588,790 B1 | 3/2017 | Wagner |
| 9,647,977 B2 | 5/2017 | Levasseur |
| 9,722,790 B2 | 8/2017 | Ebrahimi |
| 9,794,074 B2 * | 10/2017 | Toll ....................... G06F 21/602 |
| 9,818,109 B2 | 11/2017 | Loh |
| 9,830,580 B2 | 11/2017 | Macgregor |
| 9,875,510 B1 | 1/2018 | Kasper |
| 9,876,646 B2 | 1/2018 | Ebrahimi |
| 9,882,918 B1 | 1/2018 | Ford |
| 10,025,941 B1 | 7/2018 | Griffin |
| 10,046,228 B2 | 8/2018 | Tran |
| 10,102,265 B1 | 10/2018 | Madisetti |
| 10,102,526 B1 | 10/2018 | Madisetti |
| 10,108,954 B2 | 10/2018 | Dunlevy |
| 10,135,607 B1 | 11/2018 | Roets |
| 10,135,609 B2 | 11/2018 | Bibera |
| 10,163,080 B2 | 12/2018 | Chow |
| 10,250,395 B1 | 4/2019 | Borne-Pons |
| 10,270,599 B2 | 4/2019 | Nadeau |
| 10,346,815 B2 | 7/2019 | Glover |
| 10,355,869 B2 | 7/2019 | Bisti |
| 10,366,204 B2 | 7/2019 | Tanner, Jr. |
| 10,373,129 B1 | 8/2019 | James |
| 10,411,897 B2 | 9/2019 | Paolini-Subramanya |
| 10,419,225 B2 | 9/2019 | Deery |
| 10,438,285 B1 | 10/2019 | Konstantinides |
| 10,438,290 B1 | 10/2019 | Winklevoss |
| 10,476,847 B1 | 11/2019 | Smith |
| 10,532,268 B2 | 1/2020 | Tran |
| 10,586,270 B2 | 3/2020 | Reddy |
| 10,628,268 B1 | 4/2020 | Baruch |
| 10,657,151 B2 | 5/2020 | Qiu |
| 10,685,399 B2 | 6/2020 | Snow |
| 10,693,652 B2 | 6/2020 | Nadeau |
| 10,726,346 B2 | 7/2020 | Saxena |
| 10,749,848 B2 | 8/2020 | Voell |
| 10,764,752 B1 | 9/2020 | Avetisov |
| 10,783,164 B2 | 9/2020 | Snow |
| 10,817,873 B2 | 10/2020 | Paolini-Subramanya |
| 10,826,685 B1 | 11/2020 | Campagna |
| 10,841,372 B1 | 11/2020 | Ram |
| 10,855,446 B2 | 12/2020 | Ow |
| 10,873,457 B1 | 12/2020 | Beaudoin |
| 10,915,895 B1 | 2/2021 | Fogg |
| 10,929,842 B1 | 2/2021 | Arvanaghi |
| 10,949,926 B1 | 3/2021 | Call |
| 10,956,973 B1 | 3/2021 | Chang |
| 10,958,418 B2 | 3/2021 | Ajoy |
| 10,997,159 B2 | 5/2021 | Iwama |
| 11,042,871 B2 | 6/2021 | Snow |
| 11,044,095 B2 | 6/2021 | Lynde |
| 11,044,097 B2 | 6/2021 | Snow |
| 11,044,100 B2 | 6/2021 | Deery |
| 11,063,770 B1 | 7/2021 | Peng |
| 11,075,744 B2 | 7/2021 | Tormasov |
| 11,093,933 B1 | 8/2021 | Peng |
| 11,134,120 B2 | 9/2021 | Snow |
| 11,164,250 B2 | 11/2021 | Snow |
| 11,164,254 B1 | 11/2021 | Gordon, III |
| 11,170,366 B2 | 11/2021 | Snow |
| 11,171,782 B2 | 11/2021 | Tang |
| 11,205,172 B2 | 12/2021 | Snow |
| 11,265,173 B2 | 3/2022 | Liao |
| 11,276,056 B2 | 3/2022 | Snow |
| 11,281,660 B1 | 3/2022 | Pike |
| 11,295,296 B2 | 4/2022 | Snow |
| 11,296,889 B2 | 4/2022 | Snow |
| 11,328,290 B2 | 5/2022 | Snow |
| 11,334,874 B2 | 5/2022 | Snow |
| 11,347,769 B2 | 5/2022 | Snow |
| 11,348,097 B2 | 5/2022 | Snow |
| 11,348,098 B2 | 5/2022 | Snow |
| 11,423,398 B1 | 8/2022 | Mullins |
| 11,438,143 B2 | 9/2022 | Collins |
| 11,886,425 B2 | 1/2024 | Pezeshki |
| 11,943,334 B2 | 3/2024 | Snow |
| 2001/0029482 A1 | 10/2001 | Tealdi |
| 2003/0018563 A1 | 1/2003 | Kilgour |
| 2004/0085445 A1 | 5/2004 | Park |
| 2004/0168052 A1 | 8/2004 | Clisham |
| 2005/0206741 A1 | 9/2005 | Raber |
| 2006/0075228 A1 | 4/2006 | Black |
| 2006/0184443 A1 | 8/2006 | Erez |
| 2007/0027787 A1 | 2/2007 | Tripp |
| 2007/0094272 A1 | 4/2007 | Yeh |
| 2007/0174630 A1 | 7/2007 | Shannon |
| 2007/0294235 A1 | 12/2007 | Millett |
| 2007/0296817 A1 | 12/2007 | Ebrahimi |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |

(56) References Cited

U.S. PATENT DOCUMENTS

| | | |
|---|---|---|
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass |
| 2010/0228798 A1 | 9/2010 | Kodama |
| 2010/0241537 A1 | 9/2010 | Kass |
| 2011/0061092 A1 | 3/2011 | Bailloeul |
| 2011/0161674 A1 | 6/2011 | Ming |
| 2011/0199469 A1 | 8/2011 | Gallagher |
| 2012/0059824 A1 | 3/2012 | Simon |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |
| 2013/0276058 A1 | 10/2013 | Buldas |
| 2014/0022973 A1 | 1/2014 | Kopikare |
| 2014/0201541 A1 | 7/2014 | Paul |
| 2014/0229738 A1 | 8/2014 | Sato |
| 2014/0279762 A1 | 9/2014 | Xaypanya |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0052615 A1 | 2/2015 | Gault |
| 2015/0193633 A1 | 7/2015 | Chida |
| 2015/0206106 A1 | 7/2015 | Yago |
| 2015/0242835 A1* | 8/2015 | Vaughan .............. G06Q 20/227 705/39 |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | Mccarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0085955 A1 | 3/2016 | Lerner |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | Mccoy |
| 2016/0321751 A1 | 11/2016 | Creighton, IV |
| 2016/0321769 A1 | 11/2016 | Mccoy |
| 2016/0328791 A1 | 11/2016 | Parsells |
| 2016/0330031 A1 | 11/2016 | Drego |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0212781 A1* | 7/2017 | Dillenberger ......... G06F 9/5038 |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0269186 A1 | 9/2017 | Sharma |
| 2017/0330279 A1 | 11/2017 | Ponzone |
| 2017/0344983 A1 | 11/2017 | Muftic |
| 2017/0346693 A1 | 11/2017 | Dix |
| 2017/0352027 A1 | 12/2017 | Zhang |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vishwa |
| 2018/0183602 A1 | 6/2018 | Campagna |
| 2018/0189333 A1 | 7/2018 | Childress |
| 2018/0189781 A1 | 7/2018 | Mccann |
| 2018/0204213 A1 | 7/2018 | Zappier |
| 2018/0212779 A1 | 7/2018 | Bergmann |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0253702 A1 | 9/2018 | Dowding |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1* | 11/2018 | Hurley ................ G06Q 20/326 |
| 2018/0316502 A1 | 11/2018 | Nadeau |
| 2018/0330349 A1 | 11/2018 | Uhr |
| 2018/0341930 A1* | 11/2018 | Moir .................... H04L 9/3239 |
| 2018/0356236 A1 | 12/2018 | Lawrenson |
| 2018/0365201 A1 | 12/2018 | Hunn |
| 2018/0365686 A1 | 12/2018 | Kondo |

(56) References Cited

U.S. PATENT DOCUMENTS

| | | |
|---|---|---|
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0028273 A1 | 1/2019 | Harras |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |
| 2019/0057382 A1 | 2/2019 | Wright |
| 2019/0058581 A1 | 2/2019 | Wood |
| 2019/0065709 A1 | 2/2019 | Salomon |
| 2019/0073666 A1 | 3/2019 | Ortiz |
| 2019/0080284 A1 | 3/2019 | Kim |
| 2019/0081793 A1 | 3/2019 | Martino |
| 2019/0081796 A1 | 3/2019 | Chow |
| 2019/0087446 A1 | 3/2019 | Sharma |
| 2019/0123889 A1 | 4/2019 | Schmidt-Karaca |
| 2019/0132350 A1 | 5/2019 | Smith |
| 2019/0188699 A1 | 6/2019 | Thibodeau |
| 2019/0197532 A1 | 6/2019 | Jayachandran |
| 2019/0205563 A1 | 7/2019 | Gonzales, Jr. |
| 2019/0236286 A1 | 8/2019 | Scriber |
| 2019/0251199 A1* | 8/2019 | Klianev ............... G06Q 40/04 |
| 2019/0251557 A1 | 8/2019 | Jin |
| 2019/0253240 A1 | 8/2019 | Treat |
| 2019/0253258 A1 | 8/2019 | Thekadath |
| 2019/0268141 A1 | 8/2019 | Pandurangan |
| 2019/0268163 A1 | 8/2019 | Nadeau |
| 2019/0281259 A1 | 9/2019 | Palazzolo |
| 2019/0287107 A1 | 9/2019 | Gaur |
| 2019/0287199 A1 | 9/2019 | Messerges |
| 2019/0287200 A1 | 9/2019 | Schuler |
| 2019/0288832 A1 | 9/2019 | Dang |
| 2019/0296915 A1 | 9/2019 | Lancashire |
| 2019/0303623 A1 | 10/2019 | Reddy |
| 2019/0303887 A1 | 10/2019 | Wright |
| 2019/0306150 A1 | 10/2019 | Letz |
| 2019/0311357 A1 | 10/2019 | Madisetti |
| 2019/0318117 A1 | 10/2019 | Beecham |
| 2019/0319782 A1 | 10/2019 | Ghosh |
| 2019/0324867 A1 | 10/2019 | Tang |
| 2019/0332691 A1 | 10/2019 | Beadles |
| 2019/0333054 A1 | 10/2019 | Cona |
| 2019/0334715 A1 | 10/2019 | Gray |
| 2019/0334912 A1 | 10/2019 | Sloane |
| 2019/0340267 A1 | 11/2019 | Vo |
| 2019/0340586 A1 | 11/2019 | Sheng |
| 2019/0340607 A1 | 11/2019 | Lynn |
| 2019/0342422 A1 | 11/2019 | Li |
| 2019/0347444 A1 | 11/2019 | Lowagie |
| 2019/0347628 A1 | 11/2019 | Al-Naji |
| 2019/0349190 A1 | 11/2019 | Smith |
| 2019/0349426 A1 | 11/2019 | Smith |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0361917 A1 | 11/2019 | Tran |
| 2019/0372770 A1 | 12/2019 | Xu |
| 2019/0378128 A1 | 12/2019 | Moore |
| 2019/0385165 A1 | 12/2019 | Castinado |
| 2019/0386940 A1 | 12/2019 | Hong |
| 2019/0391540 A1 | 12/2019 | Westervelt |
| 2019/0391858 A1 | 12/2019 | Studnicka |
| 2019/0394044 A1 | 12/2019 | Snow |
| 2019/0394048 A1 | 12/2019 | Deery |
| 2020/0004263 A1 | 1/2020 | Dalla Libera |
| 2020/0004946 A1 | 1/2020 | Gilpin |
| 2020/0005270 A1 | 1/2020 | Griffith |
| 2020/0005290 A1 | 1/2020 | Madisetti |
| 2020/0007341 A1 | 1/2020 | Veeningen |
| 2020/0019937 A1 | 1/2020 | Edwards |
| 2020/0034571 A1 | 1/2020 | Fett |
| 2020/0034813 A1 | 1/2020 | Calinog |
| 2020/0042635 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0067907 A1 | 2/2020 | Avetisov |
| 2020/0075056 A1 | 3/2020 | Yang |
| 2020/0089690 A1 | 3/2020 | Qiu |
| 2020/0099524 A1 | 3/2020 | Schiatti |
| 2020/0099534 A1 | 3/2020 | Lowagie |
| 2020/0104712 A1 | 4/2020 | Katz |
| 2020/0118068 A1 | 4/2020 | Turetsky |
| 2020/0127812 A1 | 4/2020 | Schuler |
| 2020/0134760 A1 | 4/2020 | Messerges |
| 2020/0145219 A1 | 5/2020 | Sebastian |
| 2020/0151714 A1 | 5/2020 | Chan |
| 2020/0160326 A1 | 5/2020 | Sarin |
| 2020/0167870 A1 | 5/2020 | Isaacson |
| 2020/0175506 A1 | 6/2020 | Snow |
| 2020/0195441 A1 | 6/2020 | Suen |
| 2020/0211005 A1* | 7/2020 | Bodorik ............... G06F 9/54 |
| 2020/0211011 A1 | 7/2020 | Anderson |
| 2020/0231122 A1 | 7/2020 | Simlett |
| 2020/0234386 A1 | 7/2020 | Blackman |
| 2020/0250747 A1 | 8/2020 | Padmanabhan |
| 2020/0258061 A1 | 8/2020 | Beadles |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |
| 2020/0286082 A1 | 9/2020 | Cheng |
| 2020/0302433 A1 | 9/2020 | Green |
| 2020/0304289 A1 | 9/2020 | Androulaki |
| 2020/0314648 A1 | 10/2020 | Cao |
| 2020/0320097 A1 | 10/2020 | Snow |
| 2020/0320514 A1 | 10/2020 | Snow |
| 2020/0320521 A1 | 10/2020 | Snow |
| 2020/0320522 A1 | 10/2020 | Snow |
| 2020/0320620 A1 | 10/2020 | Snow |
| 2020/0358619 A1 | 11/2020 | Ding |
| 2020/0366495 A1 | 11/2020 | Mahoney |
| 2020/0374129 A1 | 11/2020 | Dilles |
| 2020/0382480 A1 | 12/2020 | Isaacson |
| 2020/0389294 A1 | 12/2020 | Soundararajan |
| 2021/0035092 A1 | 2/2021 | Pierce |
| 2021/0042758 A1 | 2/2021 | Durvasula |
| 2021/0044976 A1 | 2/2021 | Avetisov |
| 2021/0073212 A1 | 3/2021 | Conley |
| 2021/0073750 A1 | 3/2021 | Ledford |
| 2021/0090076 A1 | 3/2021 | Wright |
| 2021/0097602 A1 | 4/2021 | Eichel |
| 2021/0119785 A1 | 4/2021 | Ben-Reuven |
| 2021/0144149 A1 | 5/2021 | Simons |
| 2021/0174353 A1 | 6/2021 | Snow |
| 2021/0194673 A1 | 6/2021 | Collins |
| 2021/0200653 A1 | 7/2021 | Jetzfellner |
| 2021/0201321 A1 | 7/2021 | Studnitzer |
| 2021/0201328 A1 | 7/2021 | Gunther |
| 2021/0217002 A1 | 7/2021 | Basu |
| 2021/0226769 A1 | 7/2021 | Snow |
| 2021/0226773 A1 | 7/2021 | Snow |
| 2021/0234665 A1* | 7/2021 | Kramer ............... G06F 21/64 |
| 2021/0241282 A1 | 8/2021 | Gu |

(56) References Cited

U.S. PATENT DOCUMENTS

| | | |
|---|---|---|
| 2021/0248514 A1 | 8/2021 | Cella |
| 2021/0266167 A1 | 8/2021 | Lohe |
| 2021/0266174 A1 | 8/2021 | Snow |
| 2021/0272103 A1 | 9/2021 | Snow |
| 2021/0273807 A1* | 9/2021 | Wertheim ............... G06F 9/466 |
| 2021/0273810 A1 | 9/2021 | Lynde |
| 2021/0273816 A1 | 9/2021 | Deery |
| 2021/0297397 A1* | 9/2021 | Bartolucci ............... H04L 9/50 |
| 2021/0326815 A1 | 10/2021 | Brody |
| 2021/0328804 A1 | 10/2021 | Snow |
| 2021/0342836 A1 | 11/2021 | Cella |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |
| 2022/0274703 A1 | 9/2022 | Di Cosola |
| 2022/0286273 A1 | 9/2022 | Snow |
| 2022/0329630 A1 | 10/2022 | Li |
| 2022/0343768 A1 | 10/2022 | Di Cosola |
| 2022/0405260 A1 | 12/2022 | Snow |
| 2022/0407728 A1 | 12/2022 | Snow |
| 2023/0185783 A1 | 6/2023 | Haddad |
| 2023/0199677 A1 | 6/2023 | Richardson |
| 2024/0046391 A1 | 2/2024 | Ma |
| 2024/0113862 A1 | 4/2024 | Snow |
| 2024/0330317 A1 | 10/2024 | Snow |
| 2024/0388621 A1 | 11/2024 | Snow |

FOREIGN PATENT DOCUMENTS

| | | |
|---|---|---|
| CN | 110599147 A | 12/2019 |
| CN | 112329041 A | 2/2021 |
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |
| KR | 101747221 | 6/2017 |
| WO | 0049797 | 8/2000 |
| WO | 2007069176 | 6/2007 |
| WO | 2015077378 | 5/2015 |
| WO | 2017190795 A1 | 11/2017 |
| WO | 2018013898 A1 | 1/2018 |
| WO | 2018109010 | 6/2018 |
| WO | WO-2018116106 A1 * | 6/2018 ........... G06Q 20/389 |
| WO | 2018127923 A1 | 7/2018 |
| WO | 2018127923072018 | 7/2018 |
| WO | 2018208105 A1 | 11/2018 |
| WO | 2019180702 | 9/2019 |
| WO | 2019207504 | 10/2019 |
| WO | WO-2020019341 A1 * | 1/2020 ............... H04L 9/08 |
| WO | 2020125839 A1 | 6/2020 |

OTHER PUBLICATIONS

Al-Naji, Nader et al., "Basis: A Price-Stable Cryptocurrency with an Algorithmic Central Bank" www.basis.io Jun. 20, 2017, 27 pages.

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014. 7 pages.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Basis: A Price-Stable Cryptocurrency with an Algorithmic Central Bank Formerly known as: Basecoin Nader Al-Naji j@intangiblelabs.co), Josh Chen (Year: 2018) 27 pages.

Casey, "BitBeat: Factom Touts Blockchain Tool for Keeping Record Keepers Honest", Wall Street Journal, Nov. 5, 2014. 2 pages.

Chakravorty, Antorweep, and Chunming Rong, "Ushare: user controlled social media based on blockchain." Proceedings of the 11th International Conference on Ubiquitous Information Management and Communication. ACM, 2017. 6 pages.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017. 7 pages.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018). 7 pages.

Eberhardt et al., "ZoKrates—Scalable Privacy-Preserving Off-Chain Computations," https://ieeeexplore.ieee.org/ stamp/JSP?tp:::&armumber:::8726497. (Year:2018) 8 pages.

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, May 17, 2018, 15 pages.

Iddo Bentov, Bitcoin and Secure Computation with Money, May 2016 (Year: 2016). 177 pages.

Kim et al., "A Perspective on Blockchain Smart Contracts," Schulich School of Business, York University, Toronto, Canada, 2017, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018) 6 pages.

Luther, "Do we Need a "Fedcoin" Cryptocurrency?," ValueWalk, Newstex Global Business Blogs, Dec. 30, 2015 (Year: 2015) 10 pages.

Luu et al., Making Smart Contracts Smarter, 2016. 16 pages.

Menezes, Alfred. J., et al. "Handbook of Applied Cryptography," 1997, CRC Press, p. 527-28.

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

(56) References Cited

OTHER PUBLICATIONS

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.
MOF-BC: A Memory Optimized and Flexible BlockChain for Large Scale Networks. lle:///C:/Users/eoussir/Documents/e-Red%20Folder/16905961/NPL_MOF_BC_A%20Memory%20Optimized%20and%20Flexible%20Blockchain.pdf (Year:2018) 43 pages.
Muhamed et al. EduCTX: A Blockchain-Based Higher Education Credit Platform, https://ieeexplore.ieee.org/stamp/stamp.jsp?arnumber=8247166. (Year: 2017). 16 pages.
On blockchain and its integration with IoT. Challenges and opportunities. file:///C:/Users/eoussir/Downloads/1-s2.0S0167739X17329205-main%20(1). pdf (Year: 2018) 18 pages.
P. Sood, P. Palsania, S. Ahuja, S. Kumar, K. Khatter and A. Mishra, "Decentralised & Collaborative DocuPad Using Blockchain," 2022 IEEE Delhi Section Conference (DELCON), New Delhi, India, 2022, pp. 1-8, doi: 10.1109/DELCON54057.2022.9752853. ( Year: 2022).
Sokolowski, R. (2011). Signed, sealed, delivered: EMortgages are protected from unauthorized alteration by something called a tamper seal. Mortgage Banking, 71(6), 108(4). 8 pages. Retrieved from https://dialog.proquest.com/professional/docview/1068158815?accountid=131444 (Year: 2011).
United States: New Generation cryptocurrency, USDX Protocol, Offers Crypto Advantages and Fiat Pegging, Apr. 2, 2018 (Year: 2018). 3 pages.
Unknown, "Federated Learning: Collaborative Machine Learning without Centralized Training Data" Apr. 6, 2017, 11 pages.
Unknown, "Midex", https://promo.midex.com/Midex_EN.pdf, 2017, 25 pages.
Unknown, Xtrade White Paper, https://xtrade1-9649.kxcdn.com/wp-content/uploads/2017/09/xtrade-whitepaper.pdf Feb. 7, 2018, 37 pages.
Watanabe, Hiroki, et al. "Blockchain contract: Securing a blockchain applied to smart contracts." 2016 IEEE International Conference on Consumer Electronics (ICCE). IEEE, 2016. 2 pages.
White, Ron, "How Computers Work," Oct. 2003, QUE, Seventh Edition (Year: 2003), 23 pages.
Why offchain storage is needed for blockchain_V4_1 Final (Year: 2018), by IBM, 13 pages.
ZoKrates—Scalable Privacy-Preserving Off-Chain Computations, by Jacob Eberhardt, Stefan Tai , 8 pages, Nov. 3, 2011 (Year: 2011).

\* cited by examiner

TRANSACTIONAL SHARDING OF BLOCKCHAIN TRANSACTIONS

CROSS-REFERENCE TO RELATED APPLICATIONS

This application claims domestic benefit of U.S. Provisional Application No. 62/714,911 filed Aug. 6, 2018 and incorporated herein by reference in its entirety. This application also claims domestic benefit of U.S. Provisional Application No. 62/714,909 filed Aug. 6, 2018 and incorporated herein by reference in its entirety.

BACKGROUND

Cryptographic coinage and blockchains are growing in usage. As usage grows, however, scalability has become a problem. The number of blockchain transactions has greatly increased, so improved techniques are needed.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

Figure 1:
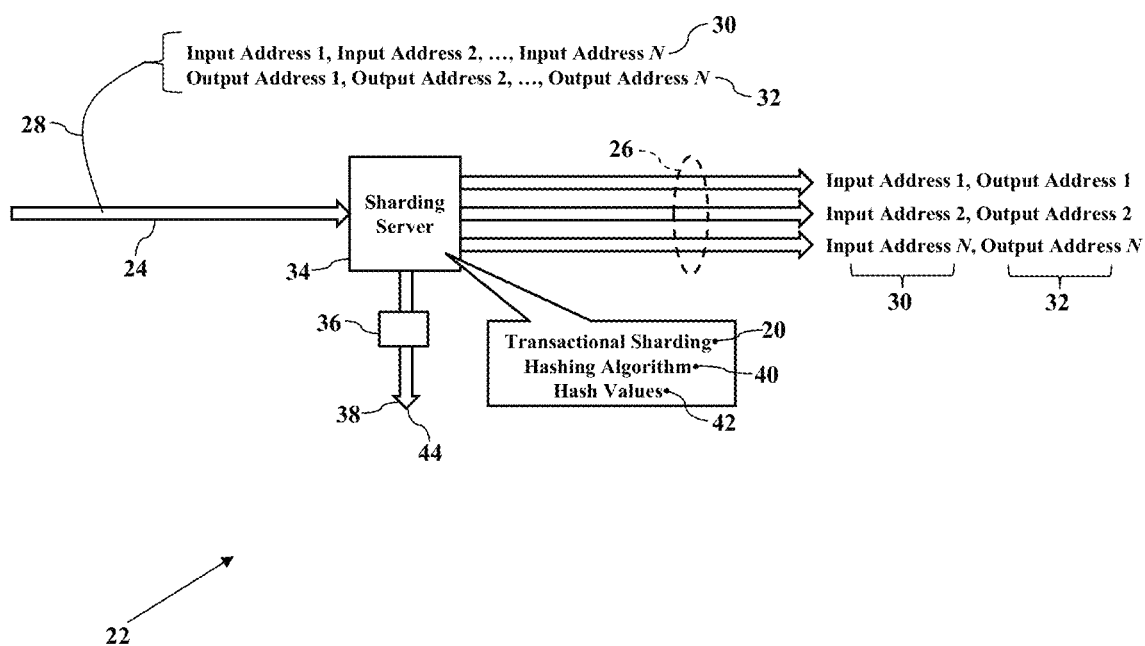
FIGS. 1-16 are simplified illustrations of a transactional sharding in a blockchain environment, according to exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-16 are simplified illustrations of a transactional sharding 20 in a blockchain environment 22, according to exemplary embodiments. A complex cryptographic coinage transaction 24 is split, or sharded, into two (2) or more simple cryptographic coinage transactions 26. The complex cryptographic coinage transaction 24 has a complex accounting structure 28, meaning that the complex cryptographic coinage transaction 24 involves or references multiple input account addresses 30 and/or multiple output account addresses 32. A sharding server 34, for example, receives the complex cryptographic coinage transaction 24 as an electronic message or data. As the sharding server 34 processes the complex cryptographic coinage transaction 24, the sharding server 34 determines the complex accounting structure 28 based on the presence or specification of either one or both of the multiple input account addresses 30 and/or multiple output account addresses 32. The sharding server 34 may thus authorize and/or implement the transactional sharding 20 of the complex cryptographic coinage transaction 24 into the multiple, simple cryptographic coinage transactions 26. That is, the complex cryptographic coinage transaction 24 is broken up or parsed into the multiple, simple cryptographic coinage transactions 26. Each one of the different simple cryptographic coinage transactions 26 only specifies or involves a single one of the input account addresses 30 and/or a single one of the output account addresses 32.

The simple cryptographic coinage transactions 26 may then be processed and recorded. While the simple cryptographic coinage transactions 26 may be dispersed within the blockchain environment 22 for debit/deposit processing (as later paragraphs will explain), FIG. 1 illustrates a blockchain recordation. That is, for simplicity, the sharding server 34 may itself process a cryptographic coinage debit transaction and a cryptographic coinage deposit transaction, according to the single input account address 30 and the single output account address 32 specified by each one of the simple cryptographic coinage transactions 26. The sharding server 34 may then generate a block 36 of data for recordation in a blockchain 38. The sharding server 34 may even call or invoke a hashing algorithm 40 to generate one or more hash values 42 representing cryptographic proofs of any of the complex cryptographic coinage transaction 24, the simple cryptographic coinage transactions 26, and/or the block 36 of data. The blockchain 38 is thus a distributed ledger 44 that documents the processing of the simple cryptographic coinage transactions 26.

Exemplary embodiments may thus generate point-to-point transactions. Each simple cryptographic coinage transaction 26 only requires information or data specifying one input account address 30 and one output account address 32. Each simple cryptographic coinage transaction 26 is thus a point-to-point component of the more complex cryptographic coinage transaction 24 that originally referenced or specified the multiple input/output address transactions 30 and 32.

Figure 2:
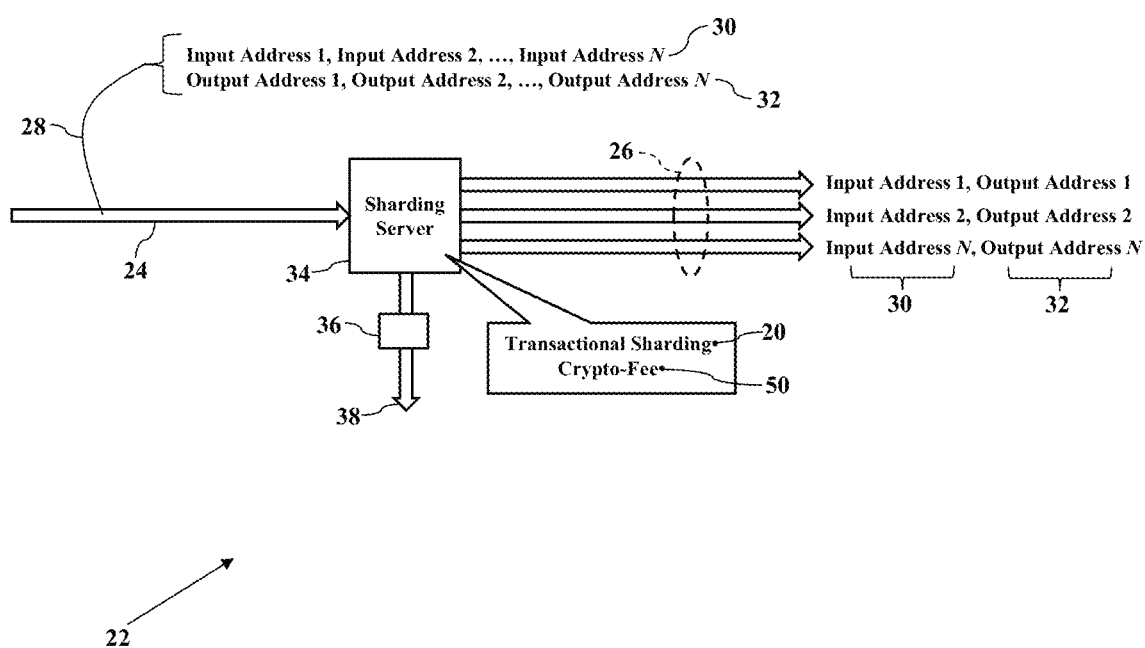

FIG. 2 illustrates cryptographic processing fees. In the blockchain environment 22, most cryptographic coinage transactions (such as the complex cryptographic coinage transaction 24 having the complex accounting structure 28) are associated with an input list of input sources (such as the multiple input account addresses 30) and a different or separate output list of output accounts (such as the multiple output account addresses 32). As the simple cryptographic coinage transactions 26 are processed, one or more cryptographic fees (or "crypto-fee") 50 may be charged, assessed, or debited. As an example, the sharding server 34 may assess or debit the cryptographic fee 50 for authorizing, implementing, or managing the transactional sharding 20 of the complex cryptographic coinage transaction 24. Another cryptographic fee 50 may further be processed for actually sharding the cryptographic coinage transaction 24 into the multiple, simple cryptographic coinage transaction 26, and further cryptographic fees 50 may be paid for processing each one of the simple cryptographic coinage transactions 26. Cryptocurrency funds may thus move from the input sources/accounts (e.g., the input account addresses 30) into the output accounts (e.g., output account addresses 32), and the cryptographic fees 50 may be charged or associated with the processing of the cryptographic coinage transaction 24 and/or performing the simple cryptographic coinage transactions 26. For example, exemplary embodiments may split a cryptographic input deposit across the output accounts based on amounts perhaps specified by the cryptographic coinage transaction 24 and/or any of the simple cryptographic coinage transactions 26. A total amount of a deposit may thus be a sum total of the inputs less the cryptographic processing fees 50. Indeed, some of the simple cryptographic coinage transactions 26 may specify an amount per input source and an amount per output.

Figure 3:
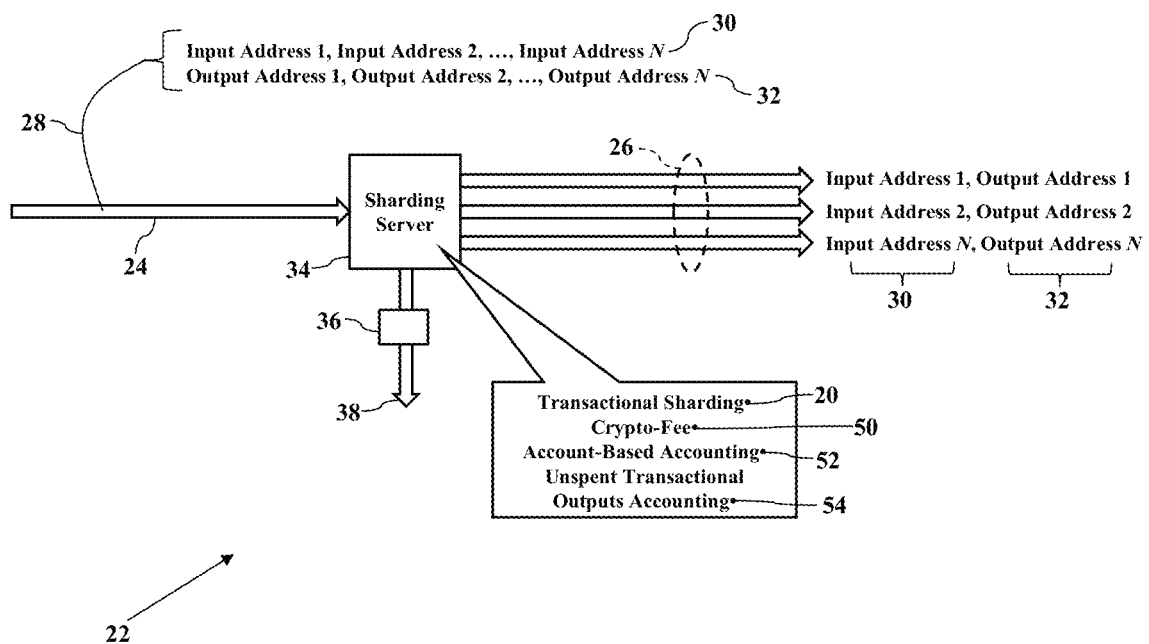

As FIG. 3 illustrates, exemplary embodiments may be applied to any accounting scheme. For example, the cryptographic fee 50 may be implemented or charged for any simple cryptographic coinage transaction 26 involving or associated with any of the input account addresses 30. The cryptographic fee 50 may additionally or alternatively be implemented or charged for any simple cryptographic coinage transactions 26 involving or associated with any of the output account addresses 32. The blockchain environment 22 may use account-based accounting 52 in which the cryptographic fees 50 are based on the account address, so in some cases the input source has more crypto-tokens than required for the simple cryptographic coinage transactions 26 and can specify a sub-amount. The blockchain environment 22, however, may use an unspent transactional outputs type accounting 54 that may use all of the balance or funds in the input source account, but the input source account may be broken up into lots of unspent transactional outputs. Exemplary embodiments may thus use an accounting difference between the unspent transactional outputs accounting 54 and the account-based accounting 52 when there are multiple input sources and multiple output destinations for one transaction. Exemplary embodiments may thus be applied to both cryptocurrencies that use unspent transactional outputs accounting 54 and to cryptocurrencies that use the account-based accounting 52.

Figure 4:
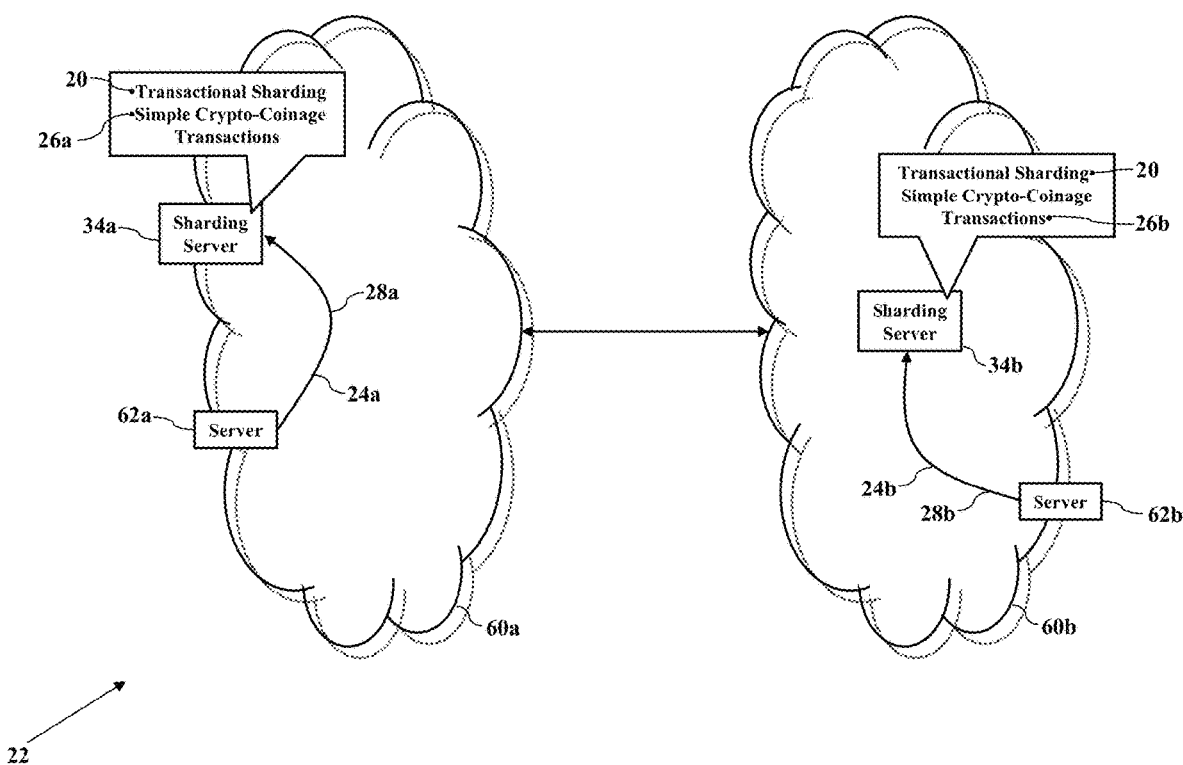

FIG. 4 further illustrates the transactional sharding 20. Here the sharding server 34 may be a component or portion of a network shard 60 within the blockchain environment 22. As the reader may understand, conventional blockchain sharding slices, or partitions, the blockchain environment 22 into defined, or even separate, network shards 60. Each network shard 60 only processes certain or specified blockchain transactions that occur within the blockchain environment 22, and each network shard 60 maintains its own state and transactional history. Each network shard 60, in other words, may have its own set of servers that are dedicated to processing a particular subset of the blockchain transactions that occur within the overall or entire blockchain environment 22. While the number of network shards 60 may be numerous, for simplicity FIG. 4 only illustrates two network shards 60a and 60b. Each network shard 60a-b may thus be scaled to increase the processing throughput of the blockchain transactions.

Exemplary embodiments may thus have multiple sharding servers 34. FIG. 4, for example, illustrates sharding server 34a dedicated to servicing the network shard 60a, while sharding server 34b services the network shard 60b. Regardless, whenever either network shard 60a or 60b encounters the cryptographic coinage transaction 24 (exhibiting the complex accounting structure 28, as explained with reference to FIG. 1), the corresponding network shard 60a or 60b may call or invoke its corresponding sharding server 34a or 34b to implement the transactional sharding 20. Suppose, for example, that a network server 62a (operating within, or assigned to, the network shard 60a) acts as a gateway and receives the complex cryptographic coinage transaction 24a. The network server 62a inspects the information or data associated with the complex cryptographic coinage transaction 24a and determines or infers the complex accounting structure 28. The network server 62a may thus pass, send, or forward the complex cryptographic coinage transaction 24a to the sharding server 34a for application of the transactional sharding 20. The sharding server 34a thus transactionally shards the complex cryptographic coinage transaction 24a into the simple cryptographic coinage transactions 26a. Again, each one of the different simple cryptographic coinage transactions 26a only specifies or involves a single one of the input account addresses 30 and/or a single one of the output account addresses 32 (as explained with reference to FIGS. 1-2). The sharding server 34a may then perform or conduct each simple cryptographic coinage transactions 26a, and/or the sharding server 34a may disperse or distribute any simple cryptographic coinage transactions 26a to another server within the network shard 60a for processing.

The network shard 60b may also have similar processing functionality. Suppose some component (such as network server 62b) operates within, or assigned to, the network shard 60b receives the complex cryptographic coinage transaction 24b. The network server 62b inspects the information or data associated with the complex cryptographic coinage transaction 24b and determines or infers the complex accounting structure 28. The network server 62b may thus pass, send, or forward the complex cryptographic coinage transaction 24b to the sharding server 34b for application of the transactional sharding 20. The sharding server 34b thus transactionally shards the complex cryptographic coinage transaction 24b into the simple cryptographic coinage transactions 26b. Again, each one of the different simple cryptographic coinage transactions 26b only specifies or involves a single one of the input account addresses 30 and/or a single one of the output account addresses 32 (as explained with reference to FIGS. 1-2). The sharding server 34b may then perform or conduct each simple cryptographic coinage transactions 26b, and/or the sharding server 34b may disperse or distribute any simple cryptographic coinage transactions 26b to another server within the network shard 60b for processing. Of course, the network shards 60a and 60b may share the services of a single sharding server 34, thus passing any complex cryptographic coinage transaction 24 for application of the transactional sharding 20.

The sharding server 34 may have a management role. The sharding server 34 may receive or accept the complex cryptographic coinage transaction 24 as an input and collect or retrieve the processing inputs, as specified by the multiple input account addresses 30. The sharding server 34 may transactionally shard the complex cryptographic coinage transaction 24 and may itself process the multiple, simple cryptographic coinage transactions 26. Preferably, though, the sharding server 34 assigns the processing of the simple cryptographic coinage transactions 26 to other servers (such as 34a and 34b) within the network shard 60a-b. The sharding server 34, in other words, may offload further processing of the simple cryptographic coinage transactions 26 and merely ensure or track processing. As a simple example, because the simple cryptographic coinage transactions 26 may have just one input account address 30 and just one output account address 32, exemplary embodiments may easily shard just by choosing some mathematical function of the input account address 30 (such as a last digit) and send the corresponding simple blockchain transaction(s) 26 to the network resource that is reserved for, dedicated to, or assigned to that last digit. If the input account address 30 has the correct amount of its account balance, then the network shard 60 updates the input account address 30 (e.g., lowering or debiting its cryptofunds) and the network shard 60 sends a deposit transaction to the network resource reserved for the output account address 32. Because deposits always pass (only the input side can fail), this scheme works well for the transactional sharding 20.

Figure 5:
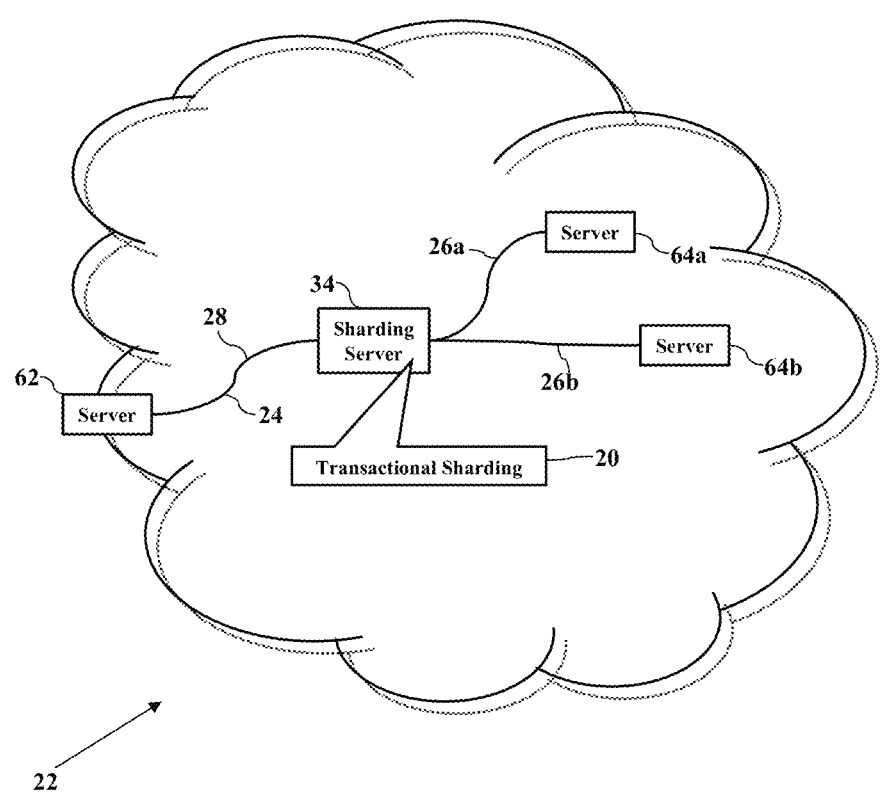

FIG. 5 also illustrates the transactional sharding 20. Here, though, the sharding server 34 may be any component or resource within the blockchain environment 22. That is, the sharding server 34 need not be dedicated to serving the network shard 60 (as illustrated in FIG. 4). The sharding server 34, instead, may simply serve the blockchain environment 22. Regardless, when the sharding server 34 receives, or is notified of, the complex cryptographic coinage transaction 24 (perhaps sent from the server 62), the sharding server 34 may identify the multiple input account addresses 30 and/or the multiple output account addresses 32 and infer the complex accounting structure 28. The sharding server 34 may transactionally shard the complex cryptographic coinage transaction 24 and generate the simple cryptographic coinage transactions 26. The sharding server 34 may collect or retrieve the processing inputs (such as the input addresses 30, the output account addresses 32, and any cryptocoinage debits and deposits) and perform or execute the simple cryptographic coinage transactions 26. However, the sharding server 34 may optionally assign the processing of the simple cryptographic coinage transactions 26 to other servers and resources within the blockchain environment 22. The sharding server 34, in other words, may send one of the simple cryptographic coinage transactions 26a to a server 64a operating within the blockchain environment 22 for processing. Another one of the simple cryptographic coinage transactions 26b may be assigned to a server 64b. Again, while exemplary embodiments may use any scheme for processing assignments, any digit in the input account address 30 (such as the last digit) is thought easiest for most readers to understand. The sharding server 34 sends the inputs and the corresponding simple cryptographic coinage transactions 26a-b to the server 64a-b that is reserved for, dedicated to, or assigned to any blockchain transactions having that last digit. If the input account address 30 has the correct amount of its account balance, the simple cryptographic coinage transactions 26 successfully passes/processes, the input account address 30 updates (e.g., lowering or debiting its crypto-funds), and the deposit transaction is sent within the blockchain environment 22 to the server reserved for the output account address 32.

Exemplary embodiments thus overcome problems associated with conventional blockchain sharding. Conventional blockchain sharding techniques use the account number to choose the network shard that processes a blockchain transaction. As long as blockchain transactions of that same type (e.g., account address) are sent to the same network shard and/or computer, that computer will have all the data related to that transaction. The problem with blockchain or cryptocurrency monetary transactions, however, is that they often have the multiple input account addresses 30 and/or the multiple output account addresses 32. Conventional blockchain sharding thus has great difficulty in picking the correct network shard/computer server for processing, as the transactional data is likely stored on multiple computers. There is no throughput advantage of having sent the complex cryptographic coinage transaction 24 (e.g., having the complex accounting structure 28) to some device that only has access to some of the required data. All of a sudden that computer needs to have all of the data for all of the input and/or output accounts, so any change to an account requires notifying all the other network nodal computers to make changes to their respective accounts, and they might simultaneously need to make their own changes to that account. Processing thus becomes very cumbersome and all efficiencies are lost in synchronizing data associated with multiple accounts in order to maintain consistent accounting. Simply put, there was no speed benefit in having network sharded the complex cryptographic coinage transaction 24. But the transactional sharding 20 computationally reduces the complex cryptographic coinage transaction 24 into the point-to-point simple cryptographic coinage transactions 26. A single network device (such as the sharding server 34) may thus store and maintain all the transactional records for any input/output account, thus making processing assignments much simpler and processing updates much faster.

Figure 6:
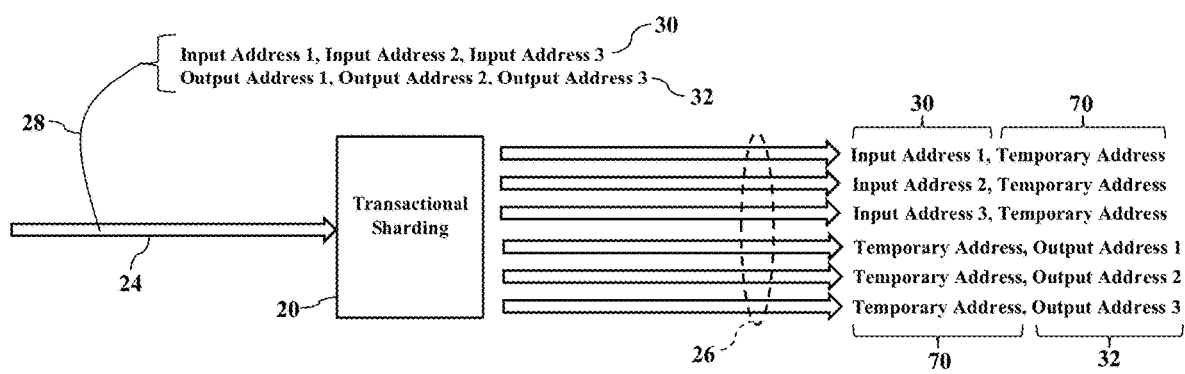

FIG. 6 illustrates a simple example of the transactional sharding 20. Suppose the complex cryptographic coinage transaction 24 (e.g., having the complex accounting structure 28) references or specifies three (3) input account addresses 30 and three (3) output account addresses 32. The complex cryptographic coinage transaction 24 may thus be described as a 3×3 transaction. Exemplary embodiments may thus split or break the complex cryptographic coinage transaction 24 into six (6) simple cryptographic coinage transactions 26 involving a temporary account address 70. That is, exemplary embodiments may establish or generate the temporary account address 70 to simply the transaction details. For example, exemplary embodiments may debit transfer crypto-funds from the three (3) input account addresses 30 into the temporary account address 70. Each input transaction thus only requires a simple debit transaction involving each single input account address 30 and the temporary account address 70 as an output. Once the three input transactions successfully complete, exemplary embodiments may deposit transfer crypto-funds from the temporary account address 70 to the three (3) output account addresses 32. Again, each output transaction only requires the single temporary account address 70 (as a debit input) and the three (3) output account addresses 32 as deposit outputs. Because exemplary embodiments establish the temporary account address 70, exemplary embodiments may split, break, or parse the 3×3 complex cryptographic coinage transaction 24 into six (6) component simple cryptographic coinage transactions 26 that only require a single input account address 30 and/or a single output account address 32. Each simple cryptographic coinage transactions 26 thus has one accounting.

Sequential processing may be preferred. While the simple cryptographic coinage transactions 26 may be processed in any order, the simple cryptographic coinage transactions 26 are preferably processed in a serial fashion. That is, the simple cryptographic coinage transactions 26 may be assigned and/or processed in a sequential order. If there are multiple, simple cryptographic coinage transactions 26 all drawing from the same input account address 30, then debit processing according to the sequential order quickly and easily identifies a failure. If the inputs do not all complete (that is, one of the input account addresses 30 does not have a sufficient balance to fulfil a transactional request), then the server computer (such as the sharding server 34) that is handling the original, complex cryptographic coinage transaction 24, instead of sending out the output transaction, instead sends out transactions that delete crypto-funds to restore the input/output account addresses 30 and 32 to rewind or put back everything before processing started (perhaps according to a timestamp or transaction number identifier).

Refunds may be processed. The computer system that is processing the refund (again, simply illustrated as the sharding server 34) may also be the same device that is handling the temporary account address 70. For example, exemplary embodiments may guarantee that the sharding server 34 collects the input data and also implements the temporary account address 70. Because there may only be one input account address 30 associated with each simple cryptographic coinage transaction 26, then the input and the temporary account address 70, and the sending of any updates to the output account address(es) 32, are all handled by one computer system. In other exemplary embodiments, however, the temporary account address 70 may be handled by a different computer system from the input account address 30, in which the different computer system (perhaps establishing or hosting the temporary account address 70) may collect all the inputs and send out all the updates to the output systems responsible for the output account addresses 32. The same computer server, of course, may collect or retrieve any or all of the inputs, establish the temporary account address 70, and send updates to any output account addresses 32. Exemplary embodiments may be functionally split between any number of servers, or merged into and performed by a single server, as desired for performance, convenience, and revenue.

Figure 7:
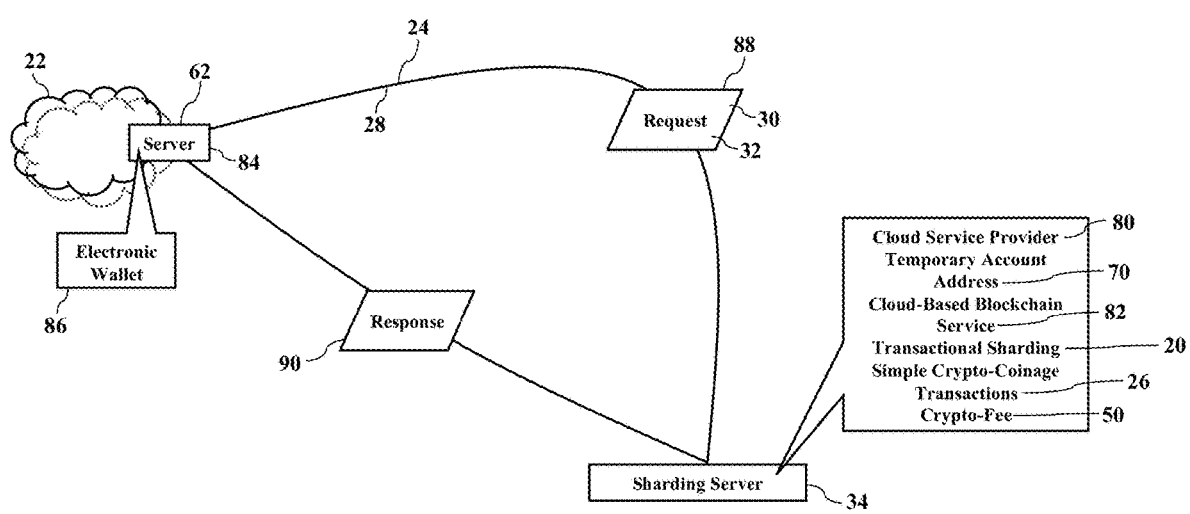
Figure 8:
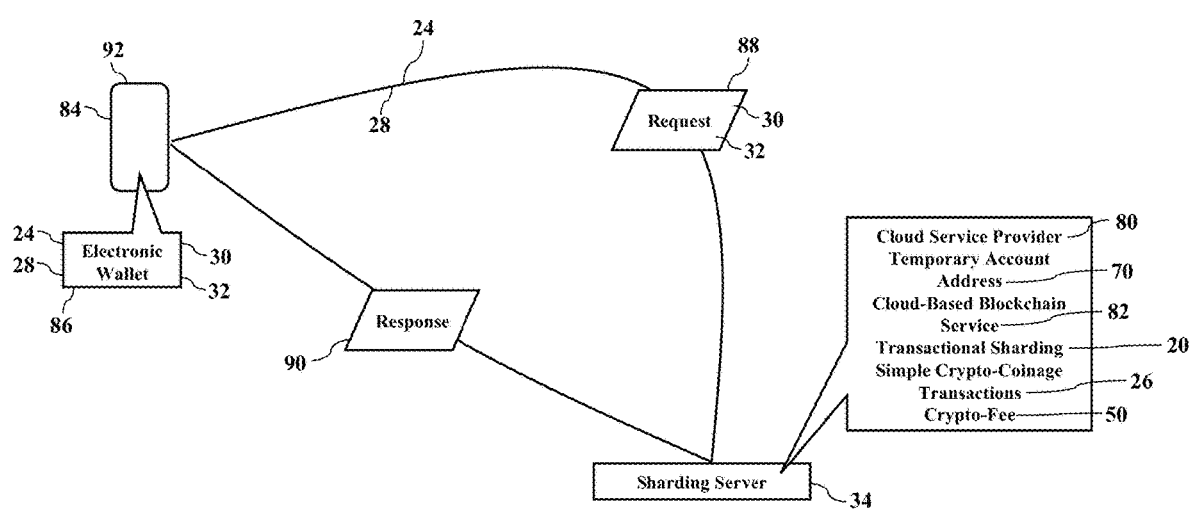

FIGS. 7-8 illustrate cloud-based services. Here the sharding server 34 may be operated on behalf of a cloud service provider 80. The cloud service provider 80 establishes the temporary account address 70, and perhaps processes the complex cryptographic coinage transaction 24 as a cloud-based blockchain service 82 on behalf of a requesting client 84. While exemplary embodiments may be agnostic to the requesting client 84, FIG. 7 illustrates the server 62 operating within the blockchain environment 22. When the server 62 determines that any electronic wallet 86 is associated with any cryptographic coinage transaction 24 exhibiting the complex accounting structure 28, the server 62 may outsource or subcontract the cryptographic coinage transaction 24 to the sharding server 34 for application of the cloud-based blockchain service 82. For example, the server 62 may generate and send service request 88 for the cloud-based blockchain service 82. The complex cryptographic coinage transaction 24 may be forwarded or sent (perhaps via the Internet) to accompany the service request 88, or the service request 88 may specify any transactional details (such as the multiple input account addresses 30, the multiple output account addresses 32, and any crypto-coinage debits and deposits). The server 62 sends the service request 88 to a network address (e.g., Internet Protocol address) associated with the remote sharding server 34 that provides the cloud-based blockchain service 82. When the sharding server 34 receives the service request 88, the sharding server 34 implements the transactional sharding 20 and performs, or oversees, the processing of the component simple cryptographic coinage transactions 26 as the cloud-based blockchain service 82. Once all the component simple cryptographic coinage transactions 26 are processed, the sharding server 34 may send a service response 90 back to the server 62 (or any other destination), and the service response 90 details the processing results of the simple cryptographic coinage transactions 26. Of course, if any one of the simple cryptographic coinage transactions 26 fails, the service response 90 may detail and/or alert of the failure. Exemplary embodiments may also charge the cryptographic fee 50 for any portion of the cloud-based blockchain service 82.

FIG. 8 further illustrates cloud-based services. Here the requesting client 84 is illustrated as a mobile smartphone 92. As the reader may understand, a user of the mobile smartphone 92 may open or access the electronic wallet 86 and order, request, or specify a transfer of crypto-funds. The mobile smartphone 92 may thus store and/or execute a mobile software application that provides an interface to the electronic wallet 86. Here, then, the mobile smartphone 92 may be programmed to locally infer the complex cryptographic coinage transaction 24. When the user of the mobile smartphone 92 orders or requests any crypto-coinage or blockchain transaction (again perhaps via the electronic wallet 86), the mobile smartphone 92 may determine the presence or specification of the multiple input account addresses 30 and/or the multiple output account addresses 32 and infers the complex accounting structure 28. Because the blockchain transaction involves the complex accounting structure 28, in response the mobile smartphone 92 may generate the service request 88 for the cloud-based blockchain service 82 that specifies either or both of the multiple input account addresses 30 and the multiple output account addresses 32. The mobile smartphone 92 sends the service request 88 to the network address (e.g., Internet Protocol address) associated with the sharding server 34. When the sharding server 34 receives the service request 88, the sharding server 34 implements the transactional sharding 20 and generates, performs, and/or manages the processing of the component simple cryptographic coinage transactions 26. Once all the component simple cryptographic coinage transactions 26 are processed (whether successful or failure), the sharding server 34 may send the service response 90 back to the mobile smartphone 92 detailing the simple cryptographic coinage transactions 26.

Figure 9:
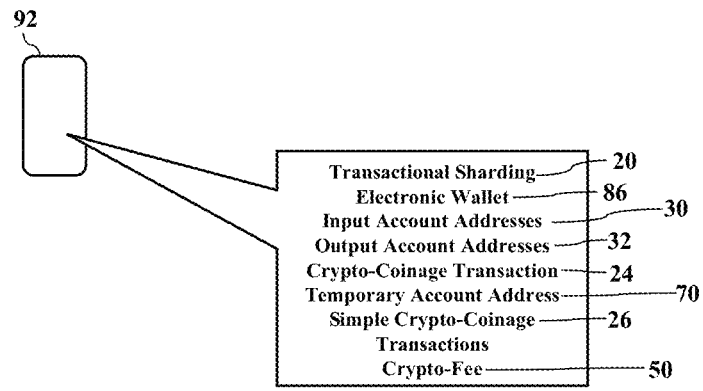

FIG. 9 illustrates a local solution. Here the mobile smartphone 92 may be programmed to locally implement and/or process the transactional sharding 20. That is, the mobile smartphone 92 may be programmed to inspect any or all crypro-coinage and blockchain transactions (perhaps generated by or associated with the electronic wallet 86). When any cryptographic coinage transaction 24 specifies the multiple input account addresses 30 and/or the multiple output account addresses 32, the mobile smartphone 92 may itself perform, or manage, the transactional sharding 20 of the complex cryptographic coinage transaction 24. The mobile smartphone 92, as an example, may be programmed to generate the component simple cryptographic coinage transactions 26 and to disperse or distribute the simple cryptographic coinage transactions 26 for processing. The mobile smartphone 92, in other words, may itself be programmed to simplify the complex cryptographic coinage transaction 24 into its component simple cryptographic coinage transactions 26. The mobile smartphone 92 may even have authority to open, establish, and/or coordinate the temporary account address 70.

Exemplary embodiments may also assess the cryptographic fee 50 for any portion of the transactional sharding 20. Cryptographic funds may be paid, or exchanged, for the transactional sharding 20. Any shard handler (that is, any service, device, or entity performing any portion of the transactional sharding 20) may charge additional cryptographic funds for the processing of each component simple cryptographic coinage transactions 26. The processing of each transactional shard (e.g., each simple cryptographic coinage transactions 26) may thus be distributed based on processing load, job backlog, and/or network congestion, especially when multiple servers compete for task assignments. The processing of each transactional shard may optionally be distributed based on account addresses.

Exemplary embodiments may thus include sharding of both blockchain transactions and of the blockchain environment 22 itself. It may be important in a fault tolerant system that the blockchain environment 22 never spread or broadcast any blockchain transaction that does not pass some sort of criterion. For example, in a cryptocurrency environment, the criterion may be that the input account address 30 has enough funds to cover the entire complex cryptographic coinage transaction 24 from the viewpoint of the nodes in the network (e.g., the blockchain environment 22). If the input account address 30 lacks a sufficient balance, then perhaps the nodes in the blockchain environment 22 will not gossip that complex cryptographic coinage transaction 24 (and/or its component simple cryptographic coinage transactions 26) all around the network. Simply put, without adequate funds, the blockchain environment 22 may not propagate any blockchain transaction. Otherwise, if any and/or all blockchain transactions is/are gossiped, then some rogue entity could fraudulently spoof the electronic wallet 86 and spew tons of bad transactions that would never clear and clog the network. Exemplary embodiments, instead, may assign the transactional sharding 20 to whatever server (such as the sharding server 34) and/or whatever slice or network shard 60 is responsible for verifying and validating the first input only. That server and/or network shard 60 thus ensures that there is/are enough funds on the input account address 30 to cover the entire sum of the component simple cryptographic coinage transactions 26 plus any cryptographic fee(s) 50.

Figure 10:
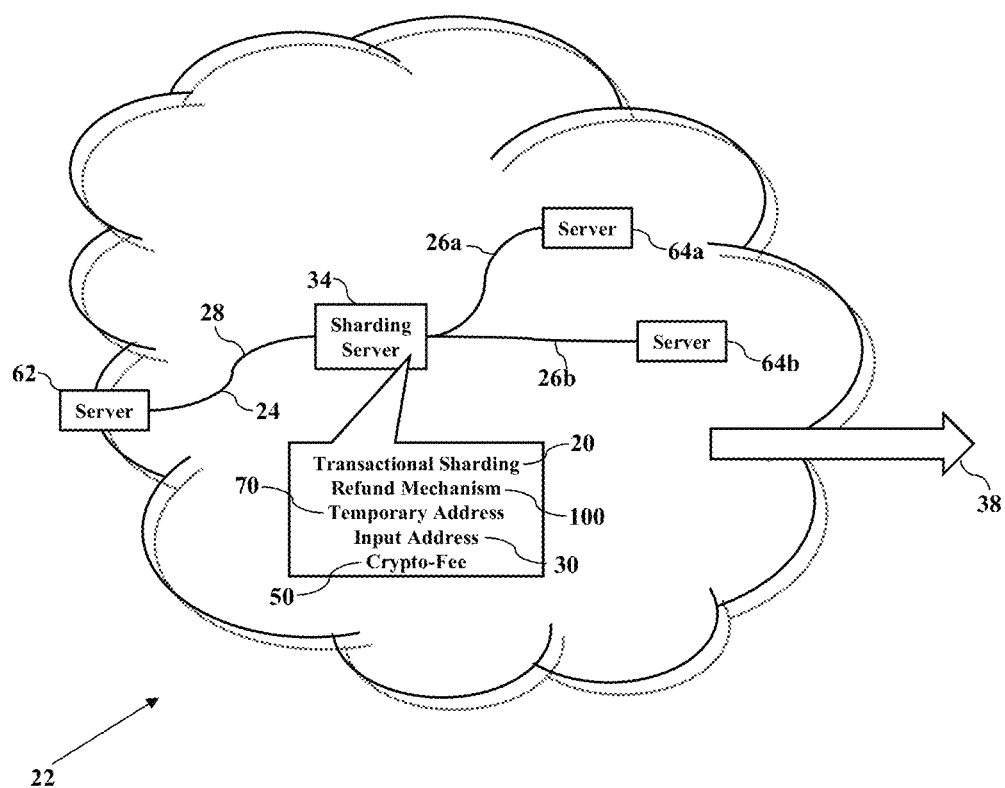

FIG. 10 illustrates a refund mechanism 100. Most blockchain transactions are sent within the blockchain environment 22 to other network nodes for processing. Most nodes within the blockchain environment 22 (such as servers 62 and/or 64) may only validate the first input. So, when processing arrives to a final computer system (such as server 64) within the blockchain environment 22, if the entire blockchain transaction validates, then each simple cryptographic coinage transactions (e.g., 26a and 26b) may be recorded to the blockchain 38. But, if any component simple cryptographic coinage transaction 26 fails to process and/or times out (e.g., the blockchain environment 22 needs time for all balances to settle before inferring any transaction will not process or fails), that failure decision may implement the refund mechanism 100. All crypto-funds may be refunded from the temporary account address 70 back to the input account addresses 30, perhaps with the exception of the first input account address 30. Exemplary embodiments may charge the first input account address 30 the cryptographic processing fee 50 for unwinding all the component simple cryptographic coinage transactions 26. That is, any input account address 30 may get a refund of whatever it contributed to the overall cryptographic coinage transaction 24, less the cryptographic processing fee 50 it would have paid had any or all of the simple cryptographic coinage transactions 26 passed. This pay-for-processing refund mechanism 100 ensures that parties to any blockchain transaction pay a penalty for submitting transactions that do not process. Basically, parties may pay crypto-fees for network inspection and processing of transactions, even failures.

Figure 11:
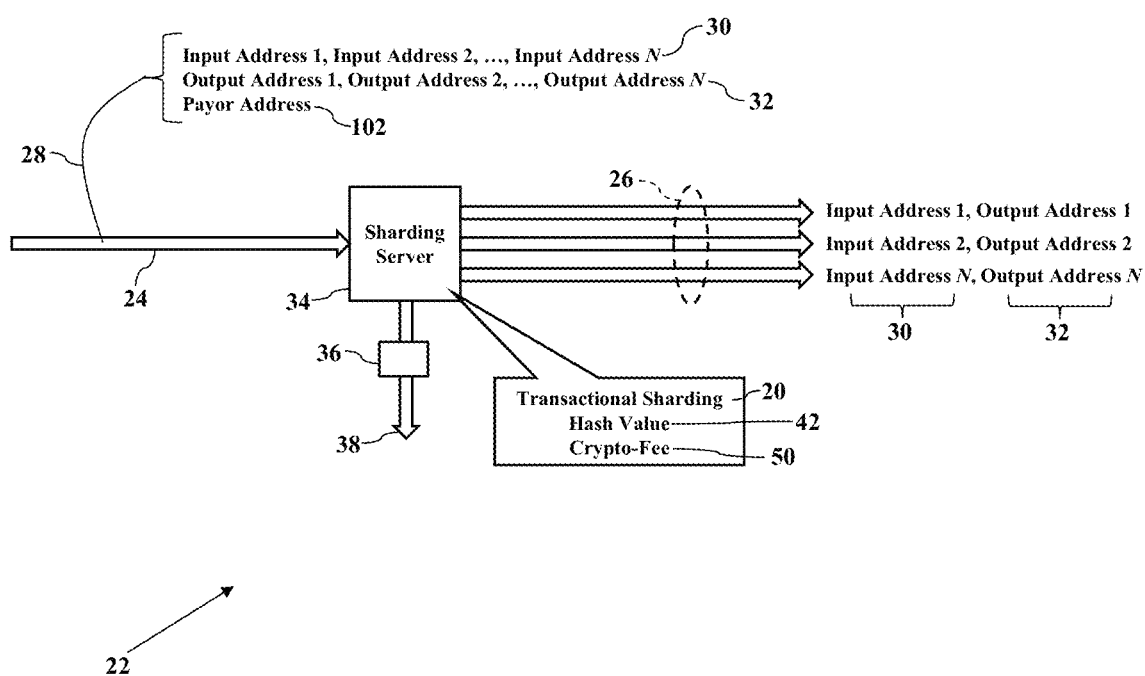

FIG. 11 illustrates a payor account address 102. The payor account address 102 pays for the transactional sharding 20. That is, the payor account address 102 may or may not be one of the multiple input account addresses 30 or the multiple output account addresses 32. For simplicity, FIG. 11 illustrates the payor account address 102 as a separate entry, data, or field from the multiple input account addresses 30 or the multiple output account addresses 32 specified by the complex cryptographic coinage transaction 24. The payor account address 102 may be represented as an entry, data, or field within any or all of the simple cryptographic coinage transactions 26. The payor account address 102 may be represented as one of the hash values 42. If the complex cryptographic coinage transaction 24 and/or the simple cryptographic coinage transactions 26 are packetized according to a packet protocol, the payor account address 102 may be represented as data or information within a header or payload within a data packet. Regardless, the payor account address(es) 102 specifies/specify the cryptocurrency account(s) that pay any or all the cryptographic processing fees 50 charged for the transactional sharding 20. The processing payer, in other words, need not be an input/output pair combination. The processing payer may thus be some party or entity (such as a subscribing financial entity) that pays for batch sharding of many complex cryptographic coinage transactions 24. Simply put, exemplary embodiments may be offered as a subscription service, and the payor account address 102 identifies the account of a subscriber.

Figure 12:
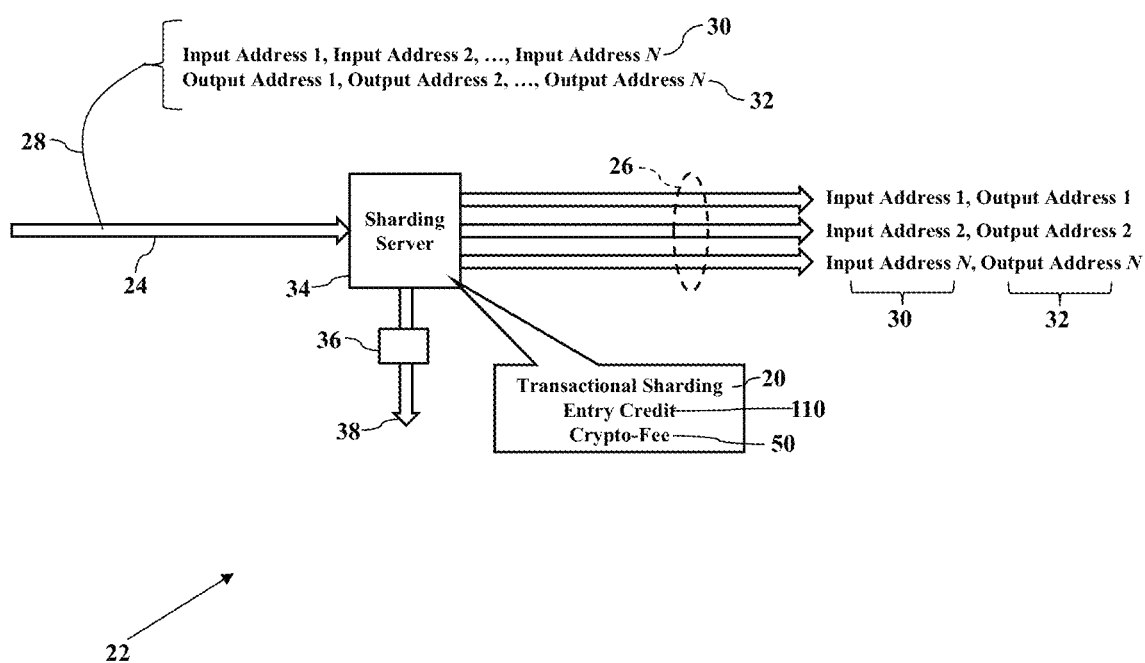

FIG. 12 illustrates entry credits 110. Here exemplary embodiments may require one or more entry credits 110 for the transactional sharding 20. That is, exemplary embodiments need not charge or assess the cryptographic processing fee 50 to/from the input account addresses 30 and/or the output account addresses 32. Instead, the entry credits 110 may be paid or redeemed for accessing or using the transactional sharding 20. Similarly, the entry credits 110 may be paid or redeemed for requesting the transactional sharding 20 as the cloud-based blockchain service 82 (as explained with reference to FIGS. 7-8). The entry credits 110 (and the cryptographic processing fees 50) may thus help protect the blockchain environment 22 from spam, numerous failed transactions, and other attacks. As the reader may understand, denial of service attacks can cripple the blockchain environment 22 and jeopardize accurate processing and recording of blockchain transactions. The entry credits 110 (and the cryptographic processing fees 50) help keep rogue entities from attacking the blockchain environment 22.

Figure 13:
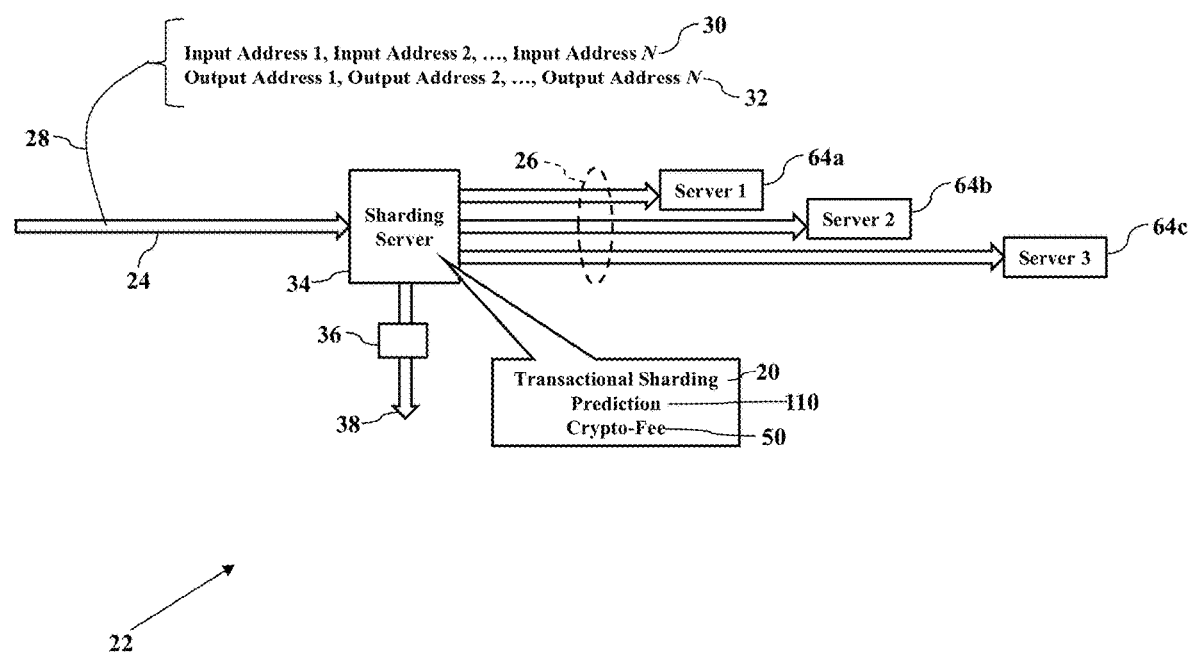

FIG. 13 illustrates predictive qualities. Here exemplary embodiments may look-ahead and predict whether a particular blockchain transaction will pass or fail. Because exemplary embodiments may transactionally shard the complex cryptographic coinage transaction 24 into the simple cryptographic coinage transactions 26, each simple cryptographic coinage transaction 26 may be assigned to a single computer server for processing (such as the servers 64*a-c*, as explained with reference to FIGS. 5 & 10). Each simple cryptographic coinage transaction 26, in other words, is a transactional shard of the complex cryptographic coinage transaction 24, and its assigned server 64*a-c* has access to all of the account data required for processing that transactional shard all at once. The single computer server 64 may thus "look ahead" and quickly generate a prediction 112 as to whether its corresponding simple cryptographic coinage transaction 26 will succeed or fail. Exemplary embodiments may thus disperse or send the prediction 112 back to some processing manager (such as the sharding server 34), without fully processing the simple cryptographic coinage transaction 26. Exemplary embodiments need only compare a current account balance to a debit amount and predict sufficiency. So, when the sharding server 34 assigns the component simple cryptographic coinage transaction 26 to the server 64 for processing, the server 64 may report back its prediction 112. Once the sharding server 34 receives all the predictions 112 associated with all the simple cryptographic coinage transactions 26, the sharding server 34 may then authorize the actual accounting. That is, if all the simple cryptographic coinage transactions 26 are predicted to pass or to successfully process, then the sharding server 34 may approve cryptographic debit transactions from the input account addresses 30 and cryptographic deposit transactions to the output account addresses 32 (according to each debit or deposit amount, as specified by each simple cryptographic coinage transaction 26). The blockchain environment 22 thus processes the simple cryptographic coinage transaction 26, generates and records the block 36 of data in the blockchain ledger 44 of the blockchain 38, and/or generates and records hash values 42 (as explained with reference to FIG. 1). However, if any one or more of the predictions 112 indicates or estimates a failure, the sharding server 34 may be programmed or configured to abandon any or all of the simple cryptographic coinage transactions 26. Because no debit transactions or deposit transactions may have been authorized, no cryptographic funds were transferred and no refunds need be processed. Still, though, exemplary embodiments may charge or recoup the cryptographic processing fee 50 for generating and processing the predictions 112 (such as from any input account address 30 that fails due to a lack of crypto-funds).

The blockchain environment 22 thus creates an immutable ledger. If all the simple cryptographic coinage transactions 26 pass, each one of the simple cryptographic coinage transactions 26 is recorded in one of the blocks 36 of data within the blockchain 38 and perhaps cryptographically hashed. However, if any simple cryptographic coinage transaction 26 fails (whether an actual failure or a predicted failure), the blockchain environment 22 may abandon some or all of the simple cryptographic coinage transactions 26 and perhaps decline to record the failure in the blockchain 38. Exemplary embodiments, however, may implement a ledger policy that also records any failure in the blockchain 38. The sharding server 34, the blockchain 38, and/or the blockchain environment 22 may thus be configured to ledger, or not to ledger, any simple cryptographic coinage transaction 26 that fails.

Figure 14:
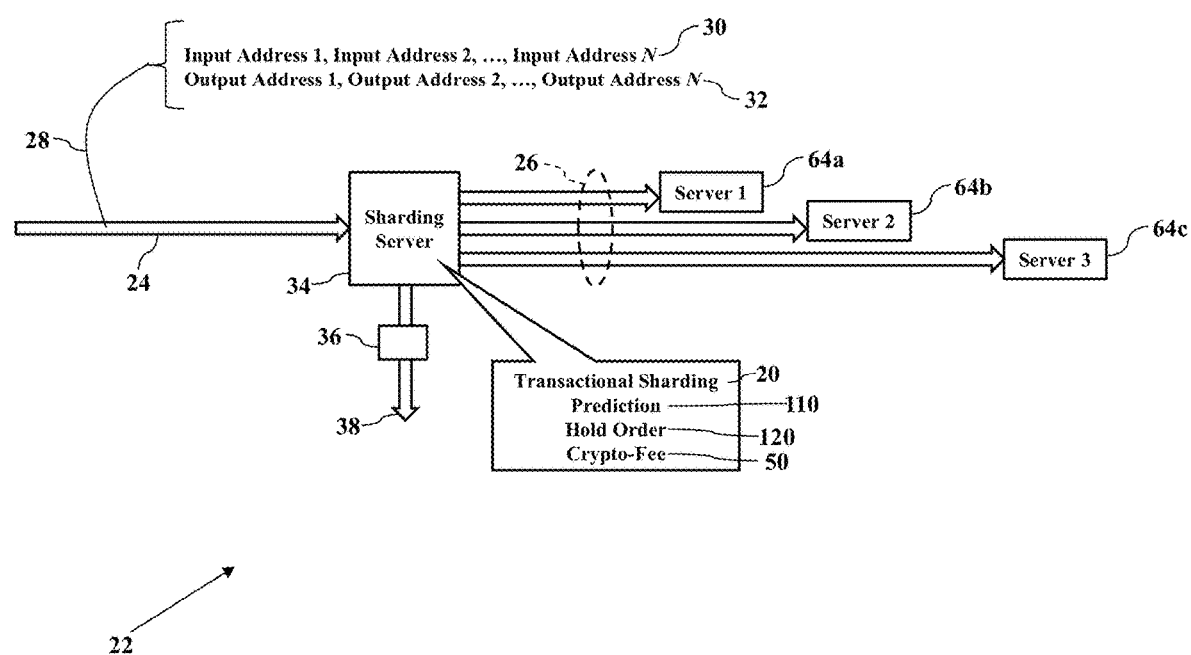

FIG. 14 illustrates cryptographic holds. Here exemplary embodiments may implement a cryptographic hold order 120 on any of the input account addresses 30. That is, when the sharding server 34 receives, or is informed of, the complex cryptographic coinage transaction 24, the sharding server 34 may place the cryptographic hold order 120 on the cryptographic debit transactions from the input account addresses 30. The cryptographic hold order 120 may thus reserve, wall off, or isolate a debit amount from any of the input account addresses 30, as specified by the complex cryptographic coinage transaction 24. The cryptographic hold order 120 may be implemented for, and associated with, a hold time to ensure debit processing successfully passes. If all the cryptographic hold orders 120 succeed, then transfer orders may be sent to move inputs to outputs. The cryptographic hold order 120 thus ensures that cryptofunds currently available in the input account addresses 30 are dedicated to the complex cryptographic coinage transaction 24. Because blockchain transactions are preferably sequentially processed (perhaps according to time or sequential number), the cryptographic hold order 120 may prevent a subsequent blockchain transaction from debiting cryptofunds previously committed to a prior or preceding blockchain transaction.

Cryptographic holds may also be placed on deposits. When any cryptofunds are actually deposited, or predicted to deposit, into any of the output account addresses 32, exemplary embodiments may place the cryptographic hold order 120 on the cryptographic deposit transactions from the output account addresses 32. The cryptographic hold order 120 may thus reserve, wall off, or isolate a deposit amount into any of the output account addresses 32, as specified by the complex cryptographic coinage transaction 24. The cryptographic hold order 120 may be implemented for, and associated with, the hold time to ensure deposit processing successfully passes. The cryptographic hold order 120 thus ensures that cryptofunds cannot be subsequently overdrawn from the output account address 32. The cryptographic hold order 120 may thus prevent a subsequent blockchain transaction from overdrawing crypto-funds.

Figure 15:
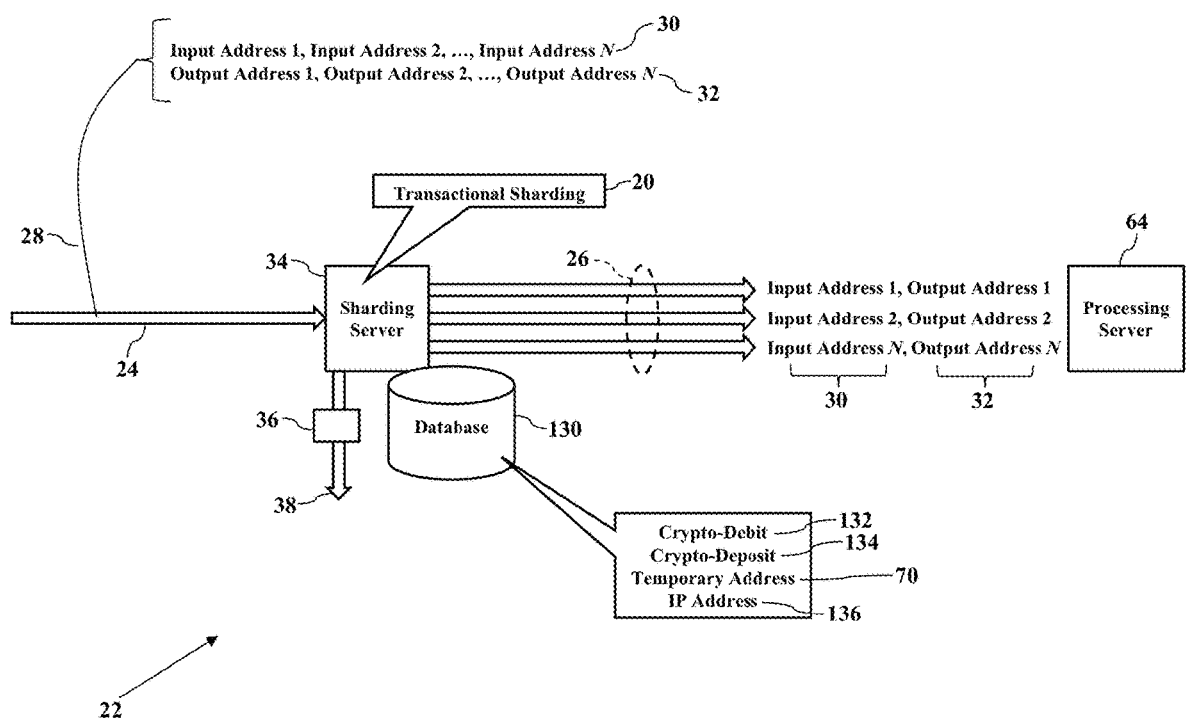
Figure 16:
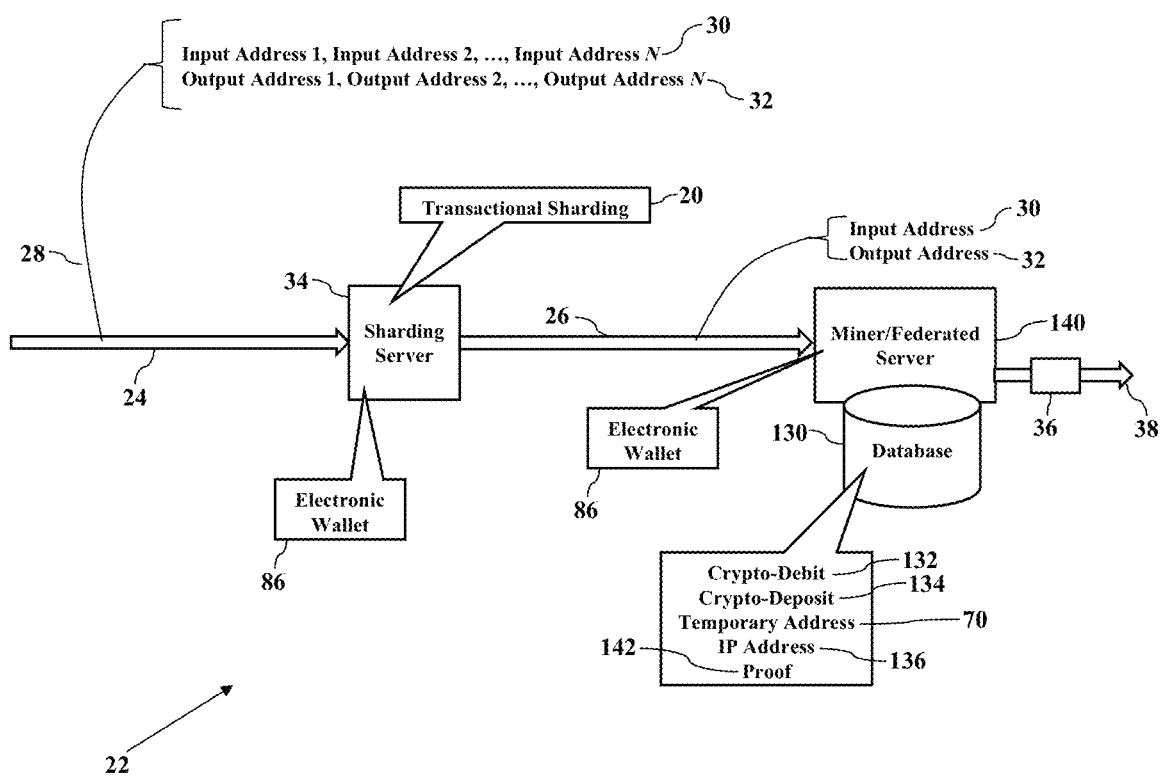

FIGS. 15-16 illustrate indexing of blockchain transactions. When the complex cryptographic coinage transaction 24 is transactionally sharded into the simple cryptographic coinage transactions 26 (via the transactional sharding 20, as above explained), exemplary embodiments may then index the input, output, and other transactional details. As a simple example, suppose the sharding server 34 stores, maintains, or access an electronic database 130. The electronic database 130 stores detailed processing records for the simple cryptographic coinage transactions 26. Suppose, for example, that the electronic database 130 has entries that relate, associate, or map each simple cryptographic coinage transaction 26 to its corresponding input account address 30 and its corresponding output account address 32. The entries may further relate each simple cryptographic coinage transaction 26 to its corresponding cryptographic debit amount 132 and cryptographic deposit amount 134. The entries may further relate each simple cryptographic coinage transaction 26 to its corresponding temporary account address 70 (if used or implemented). Moreover, the electronic database 130 may also store associations that relate each simple cryptographic coinage transaction 26 to its assigned processing server 64. For example, the electronic database 130 may relate the entries to the server's Internet protocol address 136, thus uniquely identifying the server 64 that processes the simple cryptographic coinage transaction 26. Exemplary embodiments may thus generate a central repository that indexes all the simple cryptographic coinage transactions 26 (and their respective debiting and depositing), according to the input account address 30, the output account address 32, the temporary account address 70, and/or the server 64.

FIG. 16 also illustrates indexing of blockchain transactions. Here, though, miners or federated servers (and their respective entities) may additionally or alternatively index the simple cryptographic coinage transactions 26. As the reader may understand, blockchain transactions may be processed, recorded, ledgered, and/or cryptographically hashed by one or more federated servers 140. While there may be many federated servers 140, for simplicity FIG. 16 only illustrates one federated server 140. The federated server 140 provides a service (such as processing and/or ledgering the simple cryptographic coinage transaction 26) and, in return, they are compensated according to a compensation or services agreement or scheme. Regardless, the federated server 140 may thus generate and maintain the electronic database 130 that locally indexes the simple cryptographic coinage transactions 26 processed by the federated server 140. The federated server 140 may thus index any simple cryptographic coinage transactions 26 that is receives or is instructed to process. Because every simple cryptographic coinage transaction 26 may be indexed according to amounts 132 and 134 and to account addresses 30, 32, 70, and/or 136, then the blockchain environment 22 has a mechanism to provide a cryptographic proof 142 of a current balance of any account address 30, 32, 70, without revealing, providing, or identifying information regarding other account addresses. In other words, exemplary embodiments may create a cryptographic sub-proof for an account address that does not involve (or hash) all the input account addresses 30 and/or the output account addresses 32 specified by the complex cryptographic coinage transaction 24. Moreover, the cryptographic proof 142 need not involve (or hash) all the data contained within the block 36 of data within the blockchain 38. This indexing capability increases the security of the lightweight electronic wallet 86 on mobile devices (such as the smartphone 92 explained with reference to FIGS. 7-9).

Exemplary embodiments thus present an elegant solution. The electronic wallet 86 allows the user to order or request transactions involving cryptocurrency coins. However, many cryptographic coinage transactions have the complex accounting structure 28, which creates processing complexities. Exemplary embodiments, though, implement an elegant solution that breaks down the complex cryptographic coinage transaction 24 into the simple cryptographic coinage transactions 26 having a point-to-point structure. The simple cryptographic coinage transactions 26 are quicker and easier to process, perhaps only requiring locally stored or accessible accounting information. Simply put, exemplary embodiments allow the electronic wallet 86 to be a thin-client software application that need not have programming or code for processing the cryptographic coinage transaction 24 having the complex accounting structure 28. The results of the simple cryptographic coinage transactions 26 are recorded to the blockchain 38 in a faster fashion with less messaging within the blockchain environment 22.

Exemplary embodiments may also retain current security features. The transactional sharding 20 need not affect conventional blockchain techniques, such as private keys or signs and verification via mining efforts. The transactional sharding 20 may still use a distributed consensus system that confirms pending transactions. The transactional sharding 20 is compatible with chronological/sequential ordering in the blockchain 38, still protects the neutrality of the blockchain environment 22 and network, and still allows miners to agree on the state of the system. The transactional sharding 20 is compatible cryptographic rules imposed on the block 36 of data in the blockchain 38, so verification remains compatible.

Figure 17:
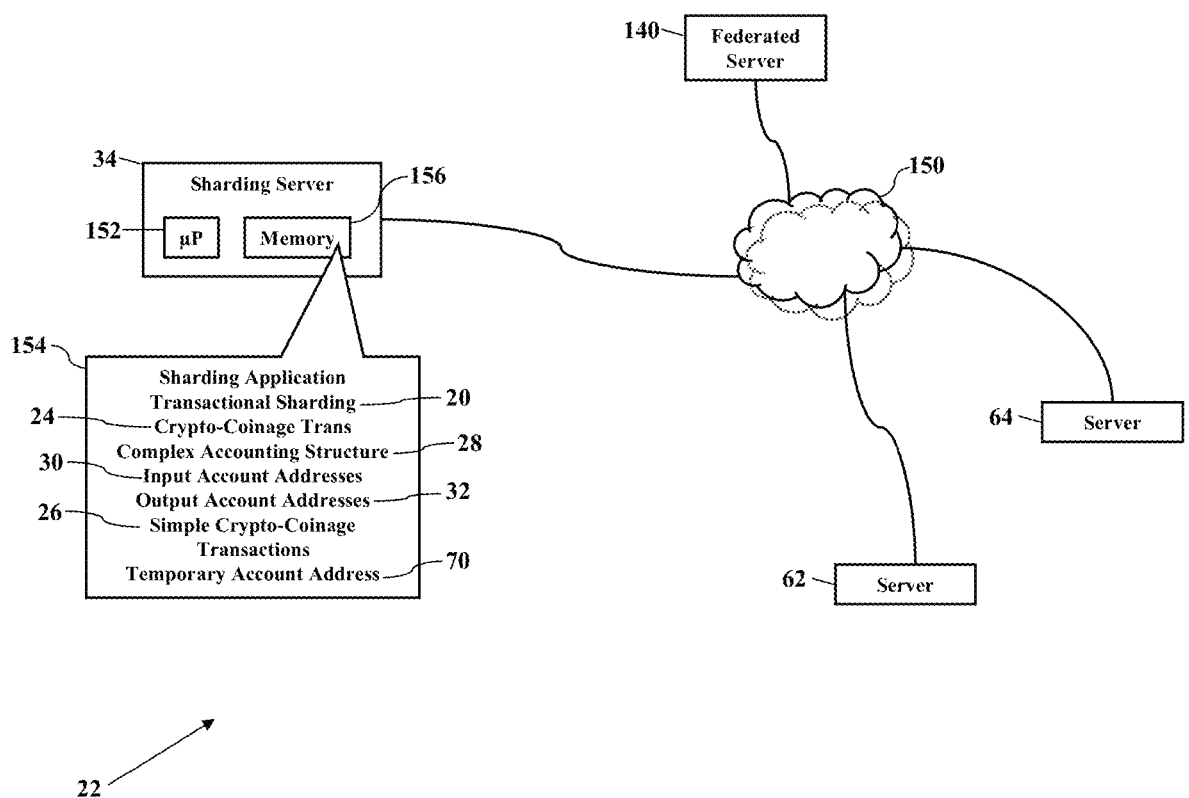
FIGS. 17-18 are more detailed illustrations of an operating environment, according to exemplary embodiments.
Figure 18:
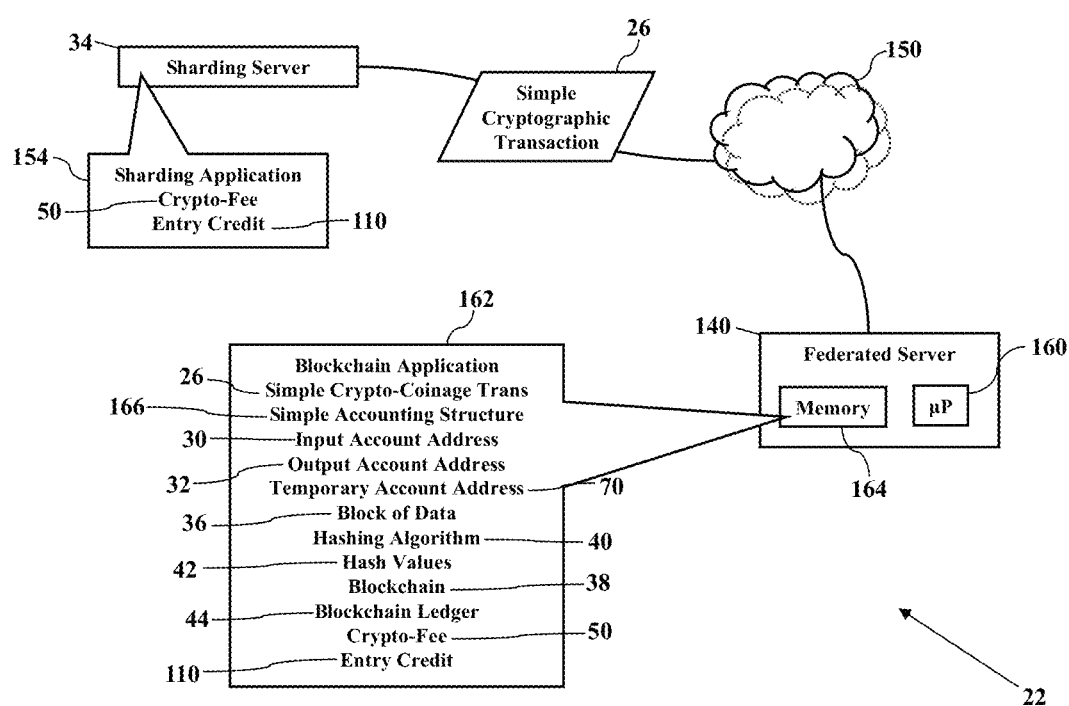

FIGS. 17-18 are more detailed illustrations of an operating environment, according to exemplary embodiments. FIG. 17 illustrates the sharding server 34 communicating via a communications network 150 with the other servers 62 and 64 in the blockchain environment 22. The sharding server 34 has a processor 152 (e.g., "µP"), application specific integrated circuit (ASIC), or other component that executes a sharding application 154 stored in a local, solid-state memory device 156. The sharding server 34 and the servers 62 and 64 have a network interface (not shown for simplicity) to the communications network 150, thus allowing two-way, bidirectional communication. The servers 62 and 64 also have processors that execute software applications stored in their local, solid-state memory devices, but these hardware components are also not shown for simplicity. The sharding application 154 includes instructions, code, and/or programs that cause the sharding server 34 to perform operations, such as authorizing and/or implementing the transactional sharding 20 of the cryptographic coinage transaction 24 (illustrated as "crypto-coinage trans"). The sharding application 154 instructs the sharding server 34 to inspect the cryptographic coinage transaction 24 and to initially determine, or to verify the presence of, the complex accounting structure 28. The complex accounting structure 28 may be inferred from any data or information indicating the presence of or specification of, the multiple input account addresses 30 and/or the multiple output account addresses 32. When the sharding server 34 determines the complex accounting structure 28, the sharding server 34 implements or authorizes the transactional sharding 20 of the "complex" cryptographic coinage transaction 24 into the multiple, simple cryptographic coinage transactions 26. The cryptographic coinage transaction 24 may thus be broken, parsed, decomposed, split, or sharded into the simple cryptographic coinage transactions 26 (perhaps using the temporary account address 70). Each one of the simple cryptographic coinage transactions 26 is a point-to-point transaction that only specifies or involves a single one of the input account addresses 30 and/or a single one of the output account addresses 32. The sharding server 34 may then disperse the simple cryptographic coinage transactions 26 via the communications network 150 for processing. That is, the sharding server 34 may itself process the debit/deposit transactions, the sharding server 34 may additionally or alternatively select or assign any processing server within the blockchain environment 22. For example, the sharding server 34 may send the simple cryptographic coinage transaction 26 to the server 64 and/or to the federated server 140.

FIG. 18 illustrates processing of the simple cryptographic coinage transaction 26. Here the sharding server 34 generates the simple cryptographic coinage transactions 26 and then disperses the simple cryptographic coinage transactions 26 for processing. That is, the sharding server 34 selects or assigns any server within the blockchain environment 22 and sends one or more of the simple cryptographic coinage transactions 26 via the communications network 150 to the server for processing. While any server or device node within the blockchain environment 22 may be capable of processing the simple cryptographic coinage transactions 26, FIG. 18 illustrates the federated server 140. The federated server 140 has a processor 160 (e.g., "μP"), application specific integrated circuit (ASIC), or other component that executes a blockchain application 162 stored in a local, solid-state memory device 164. The federated server 140 also has a network interface (not shown for simplicity) to the communications network 150, thus allowing two-way, bidirectional communication. The blockchain application 162 includes instructions, code, and/or programs that cause the federated server 140 to perform operations, such as processing the simple cryptographic coinage transaction ("simple crypto-coinage trans") 26 having a simple accounting structure 166 (e.g., debit from the single input account address 30 and/or deposit into the single output account address 32, either 30 or 32 of which may be the temporary account address 70). Moreover, the blockchain application 162 may further instruct the federated server 140 to generate the block 36 of data that documents or records the inputs and outputs associated with the simple cryptographic coinage transaction 26. The blockchain application 162 may further instruct the federated server 140 to call or invoke the hashing algorithm 40 to generate the one or more hash values 42 representing the simple cryptographic coinage transaction 26 and/or the block 36 of data. The simple cryptographic coinage transaction 26, the block 36 of data, and/or the hash values 42 may then be published via the blockchain 38 as the blockchain ledger 44.

Compensation may be due. As the simple cryptographic coinage transactions 26 are generated and/or processed, the cryptographic fee 50 may be charged, assessed, or debited. For example, the sharding server 34 may assess or debit the cryptographic fee 50 for authorizing, generating, and/or managing the transactional sharding 20 of the complex cryptographic coinage transaction 24. The cryptographic fee 50 may thus be assessed or charged to any one or more of the input account addresses 30 for the transactional sharding 20 of the complex cryptographic coinage transaction 24. Additional cryptographic fees 50 may be paid for the processing of the simple cryptographic coinage transactions 26. The cryptographic fees 50 may thus transfer to, or be deposited into, a service provider's account address that operates the sharding server 34 and/or the federated server 140 as the cloud-based blockchain service 82 (as explained with reference to FIGS. 7-8). The cryptographic fees 50 may also transfer to, or be deposited into, the payor account address 102 (as explained with reference to FIG. 11).

The entry credits 110 may be required. Exemplary embodiments may impose or require one or more of the entry credits 110 for the transactional sharding 20. The entry credits 110 may be paid or redeemed for accessing the sharding server 34 and/or for using the transactional sharding 20. Similarly, the entry credits 110 may be paid or redeemed for requesting the transactional sharding 20 as the cloud-based blockchain service 82. The entry credits 110 (and the cryptographic processing fees 50) thus protect the blockchain environment 22 from spam, numerous failed/fraudulent transactions, and other attacks. As the reader may understand, denial of service attacks can cripple the blockchain environment 22 and may jeopardize accurate processing and recording of blockchain transactions. The entry credits 110 (and the cryptographic processing fees 50) help keep rogue entities from attacking the blockchain environment 22.

Exemplary embodiments may be applied regardless of networking environment. Exemplary embodiments may be easily adapted to stationary or mobile devices having cellular, wireless local area networking capability (such as WI-FI®), near field, and/or BLUETOOTH® capability. Exemplary embodiments may be applied to mobile devices utilizing any portion of the electromagnetic spectrum and any signaling standard (such as the radio spectrum and IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 150, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 19:
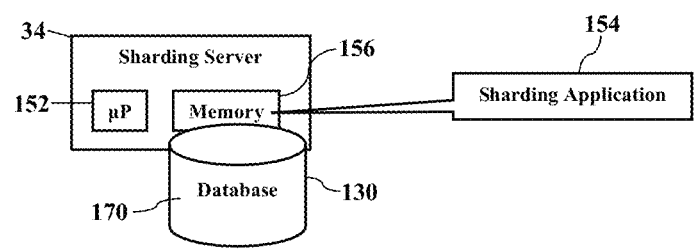
FIGS. 19-21 are more detailed illustrations of indexing a cryptographic coinage transaction, according to exemplary embodiments.
Figure 20:
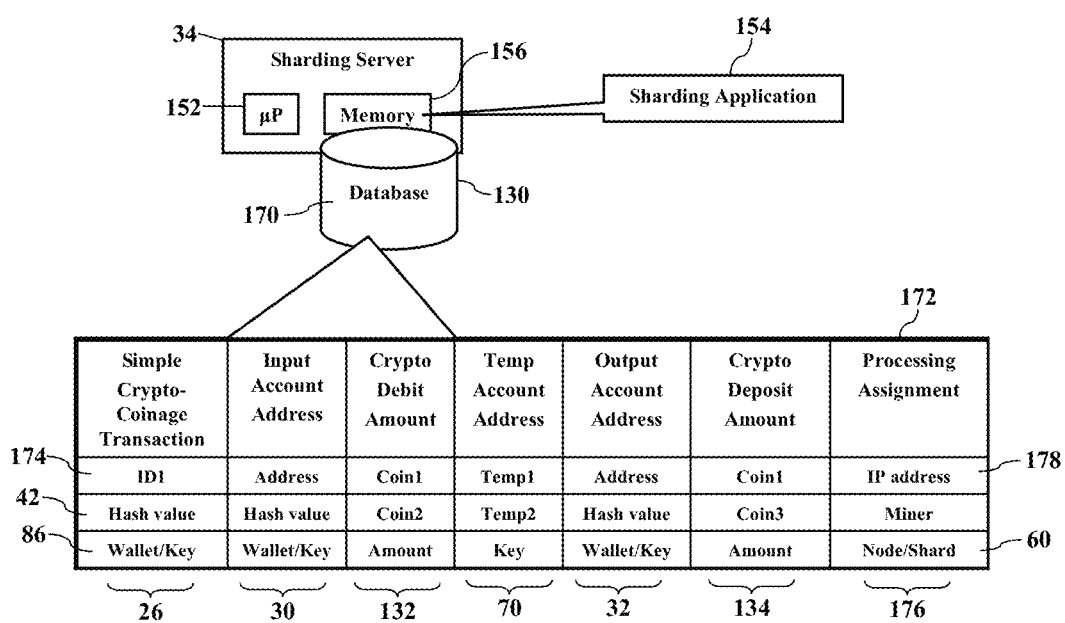
Figure 21:
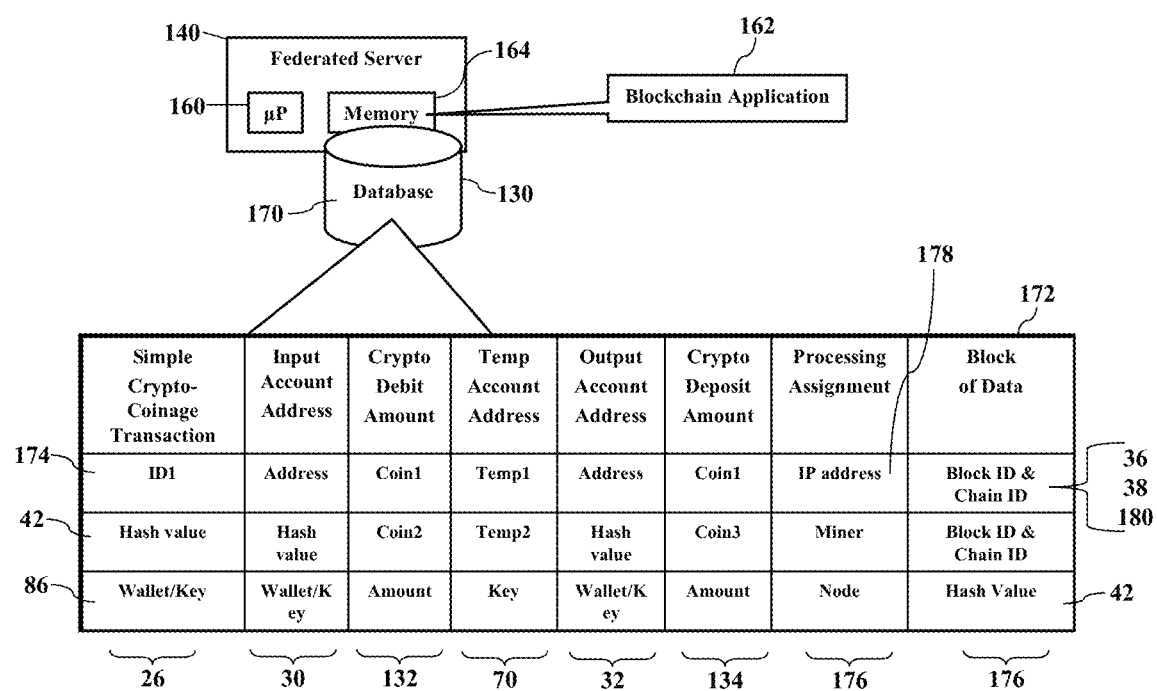

FIGS. 19-21 are more detailed illustrations of indexing the cryptographic coinage transaction 24, according to exemplary embodiments. When the so-called "complex" cryptographic coinage transaction 24 is transactionally sharded into the simple cryptographic coinage transactions 26 (via the transactional sharding 20, as above explained), exemplary embodiments may generate an electronic relational index 170 that describes the input, output, and other transactional details of each cryptographic coinage transaction 26. FIG. 19, for simplicity, illustrates the sharding server 34 locally storing the electronic database 130 in its memory device 156. The electronic database 130, though, may be remotely located and maintained by any node within the blockchain environment 22 (such as the federated server 140, as this disclosure above explains). As any simple cryptographic coinage transaction 26 is generated and/or processed within the blockchain environment 22, exemplary embodiments may remotely or locally archive its transactional details in the electronic database 130.

FIG. 20 illustrates an example of the electronic database 130. While the electronic database 130 may have any logical structure, a relational database structure is thought easiest to understand. FIG. 20 thus illustrates the index 170 as a table 172 that maps, converts, or translates each simple cryptographic coinage transaction 26 to its corresponding input account address 30, crypto-debit amount 132, temporary account address 70, output account address 32, and crypto-deposit amount 134. The simple cryptographic coinage transaction 26 may optionally be uniquely identified by an alphanumeric transaction identifier 174 and/or one of the hash values 42 generated by the hashing algorithm 40 (as above explained). Moreover, the index 170 may further relate and identify a processing assignment 176 within the blockchain environment 22. The processing assignment 176 identifies the network node or server that processes the simple cryptographic coinage transaction 26. For example, the processing assignment 176 may be the IP address 178 assigned to the servers 62 or 64, the federated server 140, and/or the network shard 60 that processes the simple cryptographic coinage transaction 26. Any of the entries in the index 170 may further relate and identify the electronic wallet 86 (and/or its public/private cryptographic key) that is associated with the simple cryptographic coinage transaction 26. Exemplary embodiments may thus generate a central repository that indexes any data or information associated with the simple cryptographic coinage transaction 26 (and its respective debiting and depositing), according to the input account address 30, the output account address 32, the temporary account address 70, and/or the processing assignment 176. Once any entry is known, exemplary embodiments may then query for any query parameter and identify, and even retrieve, its corresponding entry. Exemplary embodiments may thus perform a database lookup operation to identify and even retrieve related entries. The electronic database 130 may thus function or serve as a historical repository or archive that documents the cryptographic coinage transaction 24, its corresponding simple cryptographic coinage transactions 26, and their transactional details.

FIG. 21 further illustrates indexing of blockchain transactions. Here the electronic database 130 is locally stored and maintained by the federated server 140. Again, should the federated server 140 mine/process any simple cryptographic coinage transaction 26, the federated server 140 may update the index 170 with transactional details. The blockchain application 162, for example, instructs the federated server 140 to add entries that relate the simple cryptographic coinage transaction 26 to its corresponding input account address 30, crypto-debit amount 132, temporary account address 70, output account address 32, and crypto-deposit amount 134. Moreover, the index 170 may further identify the federated server 140 that processes the simple cryptographic coinage transactions 26 (such as its IP address 178 or network shard 60). Moreover, if exemplary embodiments generate the block 36 of data in the blockchain 38, exemplary embodiments may further log the block 36 of data (such as a unique block identifier) and the unique chain identifier 180 that documents the simple cryptographic coinage transaction 26. If the block 36 of data is hashed (using the hashing algorithm 40, as above explained), the index 170 may further log the corresponding hash value 42 as the cryptographic proof representing any of the transactional details.

Miners may index. The miner entities (operating the federated server 140) may process, record, ledger, and/or cryptographically hash the simple cryptographic coinage transactions 26. The miners provide a service (such as processing and/or ledgering the simple cryptographic coinage transactions 26) and, in return, are compensated (perhaps via the cryptographic fee 50 and/or the entry credits 110). Each miner may thus have an incentive to accurately index their mining operations to cryptographically prove processing efforts. Because any simple cryptographic coinage transactions 26 may be indexed according to amount (e.g., the crypto-debit amount 132 and/or the crypto-deposit amount 134, as above explained) and/or according to any account address (e.g., the input account address 30, the temporary account address 70, and/or the output account address 32), then the federated server 140 and the blockchain environment 22 have a mechanism to provide the cryptographic proof of the current balance of the input account address 30, the temporary account address 70, and/or the output account address 32 without revealing, providing, or identifying information regarding other account addresses 30 and 32. In other words, exemplary embodiments may create a cryptographic sub-proof for an account address that does not involve (or hash) all the input account addresses 30 and/or the output account addresses 32 specified by the complex cryptographic coinage transaction 24. Moreover, the cryptographic proof need not involve (or hash) all the data contained within the block 36 of data within the blockchain 38. This indexing capability increases the security of the lightweight electronic wallet 86 on mobile devices (such as the smartphone 92 explained with reference to FIGS. 8-9).

The index 170 may also log data according to the blockchain 38. That is, the entries in the electronic database 130 may be organized according to an identifier of the blockchain 38. A chain identifier, for example, is a unique alphanumeric combination or hash value that differentiates different blockchains. The index 170 may thus log or store entries in relational association with their corresponding chain identifier. Blockchains may thus have entries that relate a device, user, and other entries to its corresponding chain identifier. New and old data in time may be associated with, linked to, identified by, and/or retrieved using the chain identifier. Each chain identifier may thus functionally resemble a directory (e.g., files and folders), as this disclosure explains with reference to FIGS. 23-30.

Figure 22:
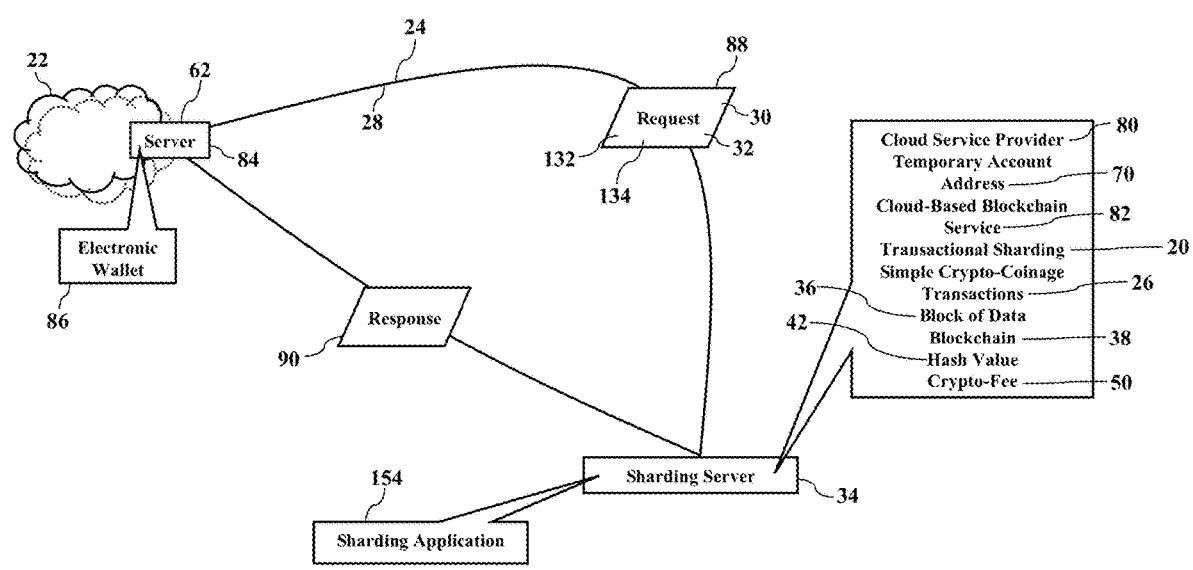
FIG. 22 illustrates the service mechanism, according to exemplary embodiments.

FIG. 22 illustrates the service mechanism, according to exemplary embodiments. This disclosure above explained how exemplary embodiments may include the cloud-based blockchain service 82 provided by the cloud service provider 80. When the blockchain environment 22 determines that the cryptographic coinage transaction 24 specifies the complex accounting structure 28, any server or device within the blockchain environment 22 may outsource or subcontract the cryptographic coinage transaction 24 to the cloud service provider 80. Suppose, for example, that any resource operating within the blockchain environment 22 (such as the server 62 acting as the requesting client 84) determines that the cryptographic coinage transaction 24 specifies the complex accounting structure 28. The server 62 may then generate and send the service request 88 via the communications network 150 to the network address (such as an Internet protocol address) associated with the sharding server 34. The service request 88 may include or specify the input account addresses 30, the output account addresses 32, the crypto-debit amount(s) 132, and/or the crypto-deposit amount(s) 134 (perhaps all specified by the cryptographic coinage transaction 24). The sharding application 154 acts on information in the service request 88, generates the simple cryptographic coinage transactions 26 (perhaps even selecting or implementing the temporary account address 70), and generates the service response 90. The service response 90 may thus merely include generating the simple cryptographic coinage transactions 26 and returning the simple cryptographic coinage transactions 26 back to the requesting client 84 for processing. The service response 90, however, may be more comprehensive and include processing the simple cryptographic coinage transactions 26, generating the block 36 of data in the blockchain 38, and perhaps generating the cryptographic hash value(s) 42 representing any of the service response 90. The requesting client 84 in the blockchain environment 22 and the sharding server 34 may thus cooperate in a client/server fashion and cooperate to send, receive, and/or generate the service request 88, the service response 90, and/or the block 36 of data in the blockchain 38. The cryptographic fee 50 may then be charged, assessed, or debited.

Figure 23:
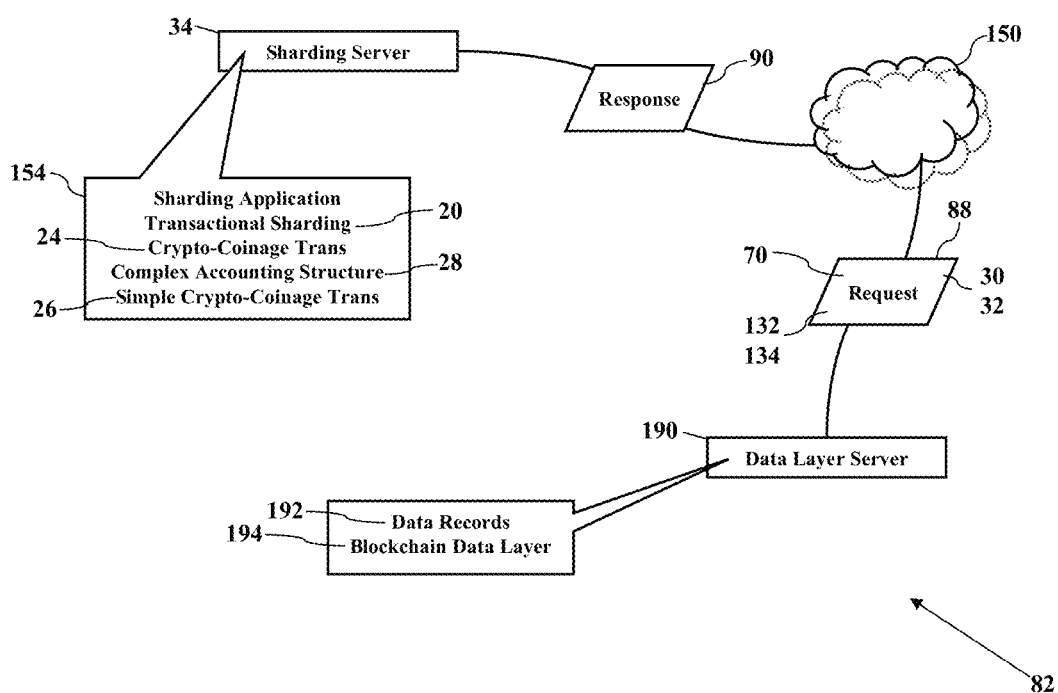
FIGS. 23-25 illustrate a cloud-based blockchain service, according to exemplary embodiments.
Figure 24:
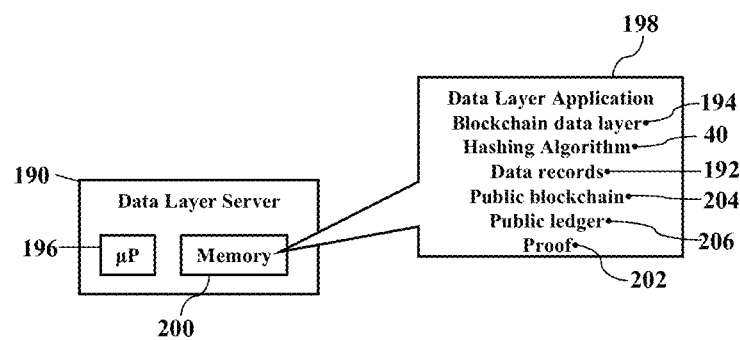
Figure 25:
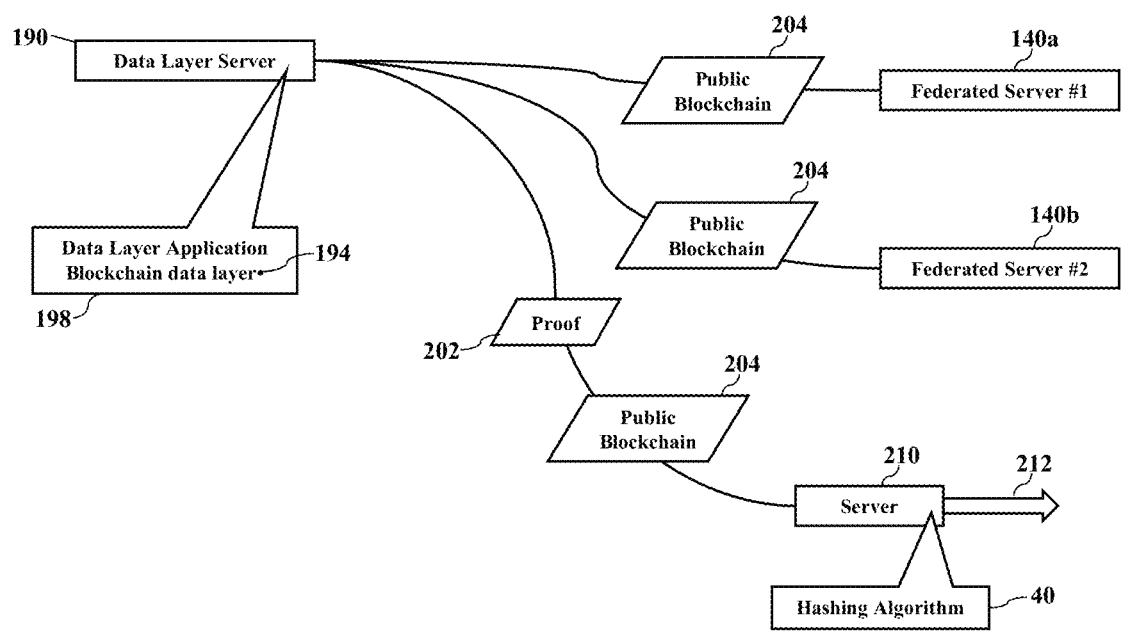

FIGS. 23-25 further illustrate the cloud-based blockchain service 82, according to exemplary embodiments. Here exemplary embodiments may further interface with a data layer server 190. The data layer server 190 generates data records 192 in a blockchain data layer 194. When the sharding server 34 implements and/or performs the transactional sharding 20 of the cryptographic coinage transaction 24 (having the complex accounting structure 28), the data records 192 in the blockchain data layer 194 may specifically describe, perhaps in detail, the transactional sharding 20 of the cryptographic coinage transaction 24 into the simple cryptographic coinage transactions 26. The sharding server 34 and the data layer server 190 may thus cooperate to provide and/or document the cloud-based blockchain service 82. For example, when the sharding server 34 receives the service request 88, the sharding server 34 may inform the data layer server 190 of the service request 88, the input account addresses 30, the output account addresses 32, the crypto-debit amounts 132, the crypto-deposit amounts 134, and/or the temporary account address 70. The sharding server 34 may simply copy and/or forward the service request 88 to the IP address associated with the data layer server 190 (as illustrated), or exemplary embodiments may generate and send a notification message that describes or contains the content of the service request 88. Moreover, the sharding server 34 may further forward or inform the data layer server 190 of the service response 90. In general, the data records 192 in the blockchain data layer 194 describe and document the service request 88 and the service response 90.

FIG. 24 further illustrates the data layer server 190. The data layer server 190 has a processor 196 (e.g., "µP"), application specific integrated circuit (ASIC), or other component that executes a data layer application 198 stored in a local, solid-state memory device 200. The data layer server 190 has a network interface to the communications network 150, thus allowing two-way, bidirectional communication. The data layer application 198 includes instructions, code, and/or programs that cause the data layer server 190 to perform operations, such as generating the data records 192 in the blockchain data layer 194. Moreover, the data layer server 190 may also add an additional layer of cryptographic hashing (using the hashing algorithm 40) to generate one or more cryptographic proofs 202. The cryptographic proofs 202 may then be incorporated into a public blockchain 204. The cloud-based blockchain service 82 may then publicly publish or distribute the public blockchain 204 (such as via the Internet). The public blockchain 204 thus serves or acts as a validation of the cloud-based blockchain service 82 (perhaps described by the data records 192 within the blockchain data layer 194). The public blockchain 204 thus publishes the cryptographic proofs 202 to confirm that the complex cryptographic coinage transaction 24 was transactionally sharded into the simple cryptographic coinage transactions 26 and processed to success or failure. The cryptographic proof 202, in other words, acts as a data anchor in the public blockchain 204 to document the date and time that the cloud-based blockchain service 82 was executed. The public blockchain 204 thus acts as a public blockchain ledger 206 that establishes chains of blocks of immutable evidence. Each cryptographic proof 202 thus provides evidentiary documentation of the cloud-based blockchain service 82.

FIG. 25 illustrates additional publication mechanisms. Once the blockchain data layer 194 is generated, some of the blockchain data layer 194 may be published in a decentralized manner to any destination. The data layer server 190, for example, may generate and distribute the public blockchain 204 (via the communications network 150 illustrated in FIGS. 17-18) to one or more of the federated servers 140. The federated server 140 provides a service and, in return, is compensated according to a compensation or services agreement or scheme.

Exemplary embodiments include still more publication mechanisms. For example, the cryptographic proof 202 and/or the public blockchain 204 may be sent (via the communications network 150 illustrated in FIGS. 17-18) to yet another server 210. The server 210 may then add another, third layer of cryptographic hashing (perhaps using the hashing algorithm 40) and generate another or second public blockchain 212. While the server 210 and/or the second public blockchain 212 may be operated by, or generated for, any entity, exemplary embodiments may integrate another cryptographic coin mechanism. That is, the server 210 and/or the second public blockchain 212 may be associated with BITCOIN®, ETHEREUM®, RIPPLE®, or other cryptographic coin mechanism. The cryptographic proof 202 and/or the second public blockchain 212 may be publicly distributed and/or documented as evidentiary validation. The cryptographic proof 202 and/or the second public blockchain 212 may thus be historically and publicly anchored for public inspection and review.

Figure 26:
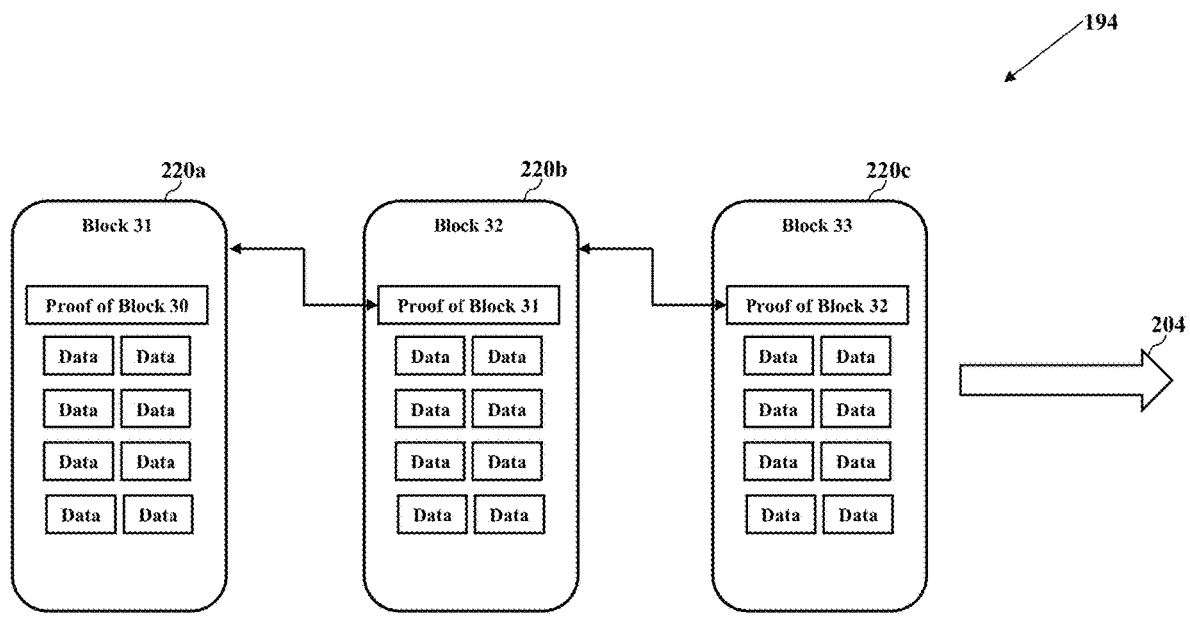
FIGS. 26-30 illustrate a blockchain data layer, according to exemplary embodiments.

FIGS. 26-30 further illustrate the blockchain data layer 194, according to exemplary embodiments. The blockchain data layer 194 may chain hashed directory blocks 220 of data into the public blockchain 204. For example, the blockchain data layer 194 accepts input data (such as the service request 88, input account addresses 30, the output account addresses 32, the crypto-debit amounts 132, the crypto-deposit amounts 134, the temporary account address 70, and/or the service response 90, as above explained) within a window of time. While the window of time may be configurable from fractions of seconds to hours, exemplary embodiments use ten (10) minute intervals. FIG. 26 illustrates a simple example of only three (3) directory blocks 220a-c of data, but in practice there may be millions or billions of different blocks. Each directory block 220 of data is linked to the preceding blocks in front and the following or trailing blocks behind. The links are created by hashing all the data within a single directory block 220 and then publishing that hash value within the next directory block. Each directory block 220 of data may further include or reference or specify the privacy parameter 64.

Figure 27:
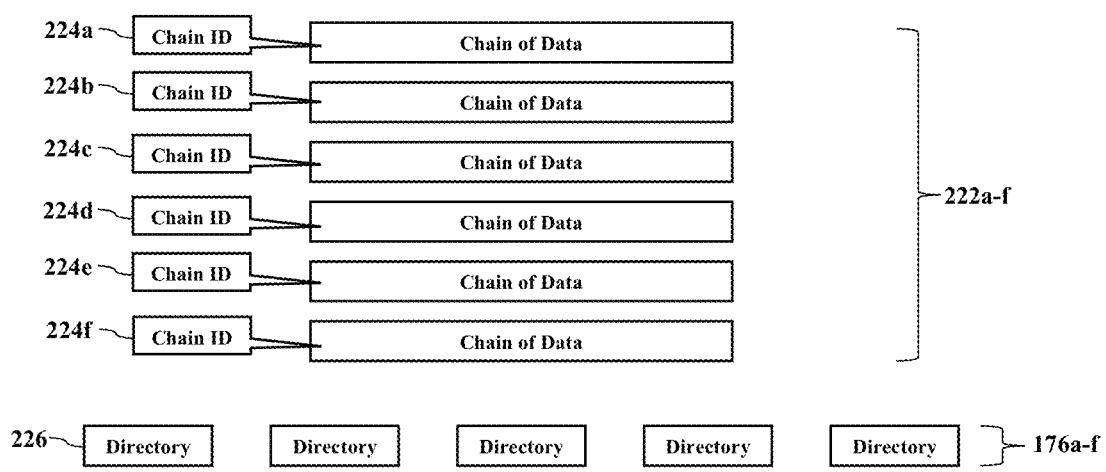

As FIG. 27 illustrates, published data may be organized within chains 222. Each chain 222 is created with an entry that associates a corresponding chain identifier 224. Any device, network node, user, or requesting client, in other words, may have its/her corresponding chain identifier 224a-d. The blockchain data layer 194 may thus track any data associated with the entity with its corresponding chain identifier 224a-d. New and old data in time may be associated with, linked to, identified by, and/or retrieved using the chain identifier 224a-d. Each chain identifier 224a-d thus functionally resembles a directory 226a-d (e.g., files and folders) for organized data entries according to the entity. Each chain 222 and/or each directory 226 may further include or reference or specify the service request 88, input account addresses 30, the output account addresses 32, the crypto-debit amounts 132, the crypto-deposit amounts 134, the temporary account address 70, and/or the service response 90.

Figure 28:
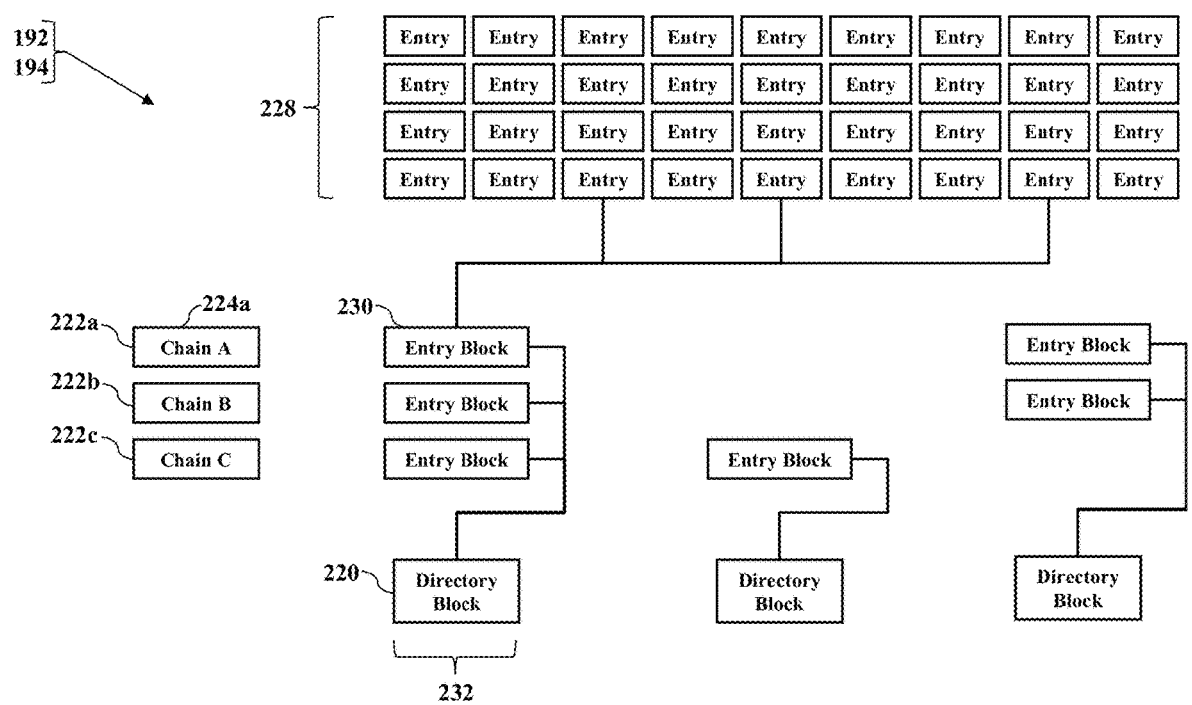

FIG. 28 illustrates the data records 192 in the blockchain data layer 194. As data is received as an input (such as the blocks 56 of data, the service request 88, the input account addresses 30, the output account addresses 32, the crypto-debit amounts 132, the crypto-deposit amounts 134, the temporary account address 70, and/or the service response 90), data is recorded within the blockchain data layer 194 as an entry 228. While the data may have any size, small chunks (such as 10 KB) may be pieced together to create larger file sizes. One or more of the entries 228 may be arranged into entry blocks 230 representing each chain 222 according to the corresponding chain identifier 224. New entries for each chain 222 are added to their respective entry block 230 (again perhaps according to the corresponding chain identifier 224). After the entries 228 have been made within the proper entry blocks 230, all the entry blocks 230 are then placed within the directory block 220 generated within or occurring within a window 232 of time. While the window 232 of time may be chosen within any range from seconds to hours, exemplary embodiments may use ten (10) minute intervals. That is, all the entry blocks 230 generated every ten minutes are placed within in the directory block 220. Each entry 228, each entry block 230, and each directory block 220 may further include or reference or specify the service request 88, input account addresses 30, the output account addresses 32, the crypto-debit amounts 132, the crypto-deposit amounts 134, the temporary account address 70, and/or the service response 90.

Figure 29:
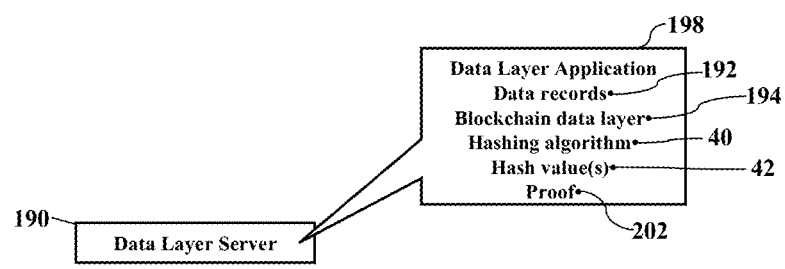

FIG. 29 illustrates cryptographic hashing. The data layer server 190 executes the data layer application 198 to generate the data records 192 in the blockchain data layer 194. The data layer application 198 may then instruct or cause the data layer server 190 to execute the hashing algorithm 40 on the data records 192 (such as the directory block 220 explained with reference to FIGS. 26-28). The hashing algorithm 40 thus generates the one or more hash values 42 as a result, and the hash values 42 represent the hashed data records 192. As one example, the blockchain data layer 194 may apply a Merkle tree analysis to generate a Merkle root (representing a Merkle cryptographic proof 202) representing each directory block 220. The data layer server 190 may then publish the Merkle proof 202 in the public blockchain 204 (as this disclosure above explains).

Figure 30:
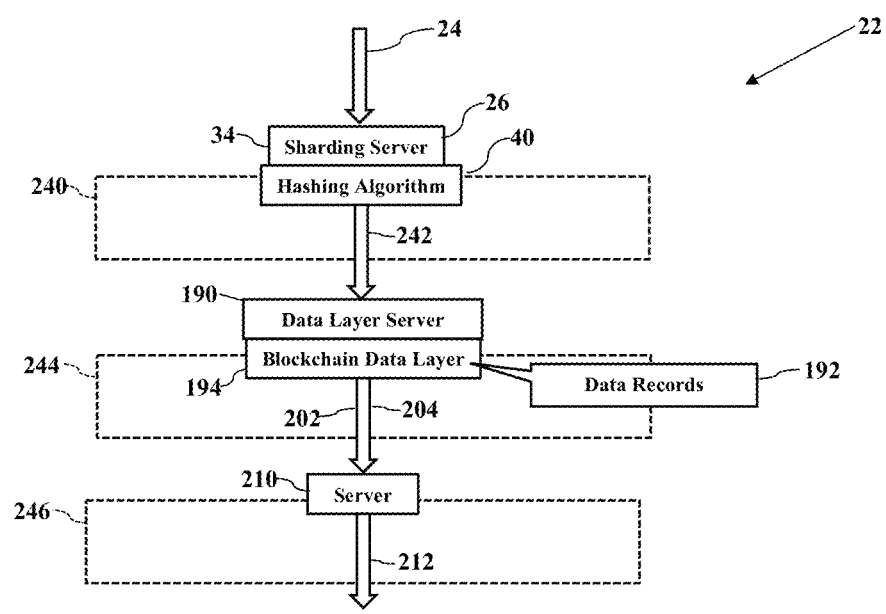

FIG. 30 illustrates hierarchical hashing. The sharding server 34 may receive the complex cryptographic coinage transaction 24, implement the transactional sharding 20, and generate the multiple, simple cryptographic coinage transactions 26. The sharding server 34 may then call or execute the hashing algorithm 40 to provide a first layer 240 of cryptographic hashing and then generate a first blockchain 242. Any blocks of data within the first blockchain 242 may be sent to a destination associated with the data layer server 190. The data layer server 190 may thus generate the data records 192 in the blockchain data layer 194. The data layer server 190 may optionally provide a second or intermediate layer 244 of cryptographic hashing to generate the cryptographic proof 202. The data layer server 190 may also publish any of the data records 192 as the public blockchain 204. The cryptographic proof 202 may or may not also be published via the public blockchain 204, perhaps again based on the privacy parameter 64. The public blockchain 204 and/or the cryptographic proof 202 may be optionally sent to the server 210 as an input to yet another public blockchain 212 (again, such as BITCOIN®, ETHEREUM®, or RIPPLE®) for a third layer 246 of cryptographic hashing and public publication. The first layer 240 and the second layer 242 thus ride or sit atop a conventional public blockchain 212 (again, such as BITCOIN®, ETHEREUM®, or RIPPLE®) and provide additional public and/or private cryptographic proofs.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 31:
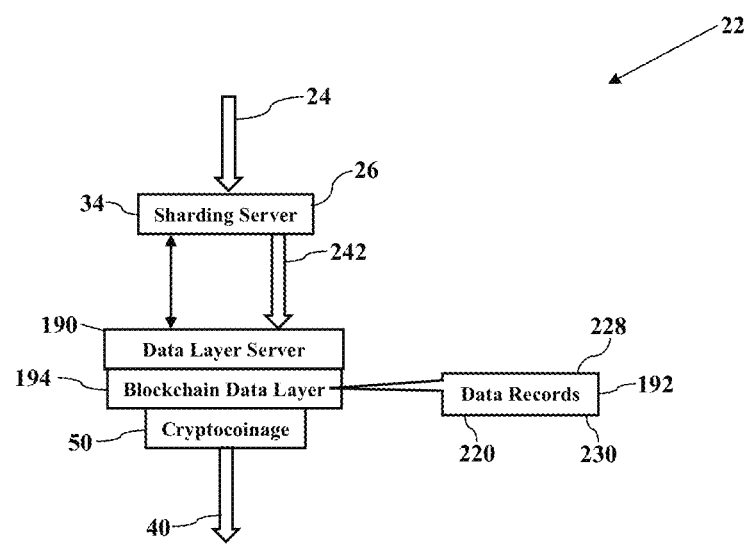
FIG. 31 further illustrates crypto-payments, according to exemplary embodiments.

FIG. 31 further illustrates crypto-payments, according to exemplary embodiments. As this disclosure above explained, when the data layer server 190 generates the data records 192 in the blockchain data layer 194, exemplary embodiments may compensate the cloud-based service provider 80 operating the sharding server 34 and/or the data layer server 190. While the compensation may be a conventional currency, FIG. 31 again illustrates the cryptographic fee 50. Here, though, the cryptographic fee 50 may be based on the data records 192 generated in the blockchain data layer 194. That is, exemplary embodiments may charge, impose, and/or process the cryptographic fee 50 based on the entries 228, entry blocks 230, and/or the directory blocks 220 generated within the blockchain data layer 194. That is, as the data records 192 are generated, exemplary embodiments may sum or count the entries 228, entry blocks 230, and/or the directory blocks 220 that are generated over time (such as per second, per minute, or other interval). The cloud-based blockchain service 82, for example, calls or initializes a counter having an initial value (such as zero). At an initial time, the counter commences or starts counting or summing the number of the entries 228, entry blocks 230, and/or the directory blocks 220 (generated within the blockchain data layer 194) that are commonly associated with or reference the input account address 30, output account address 32, and/or temporary account address 70. The counter stops counting or incrementing at a final time and/or when no more data records 192 are generated. Regardless, exemplary embodiments determine or read the final value or count. Exemplary embodiments may then sum or tally a total number of the data records 192 that were generated and perhaps even a rate 268 of generation (e.g., the sum or count over time). The service provider may then process the cryptographic fee 50 based on the total number of the data records 192 and/or the rate 268 of generation within the blockchain data layer 194.

Figure 32:
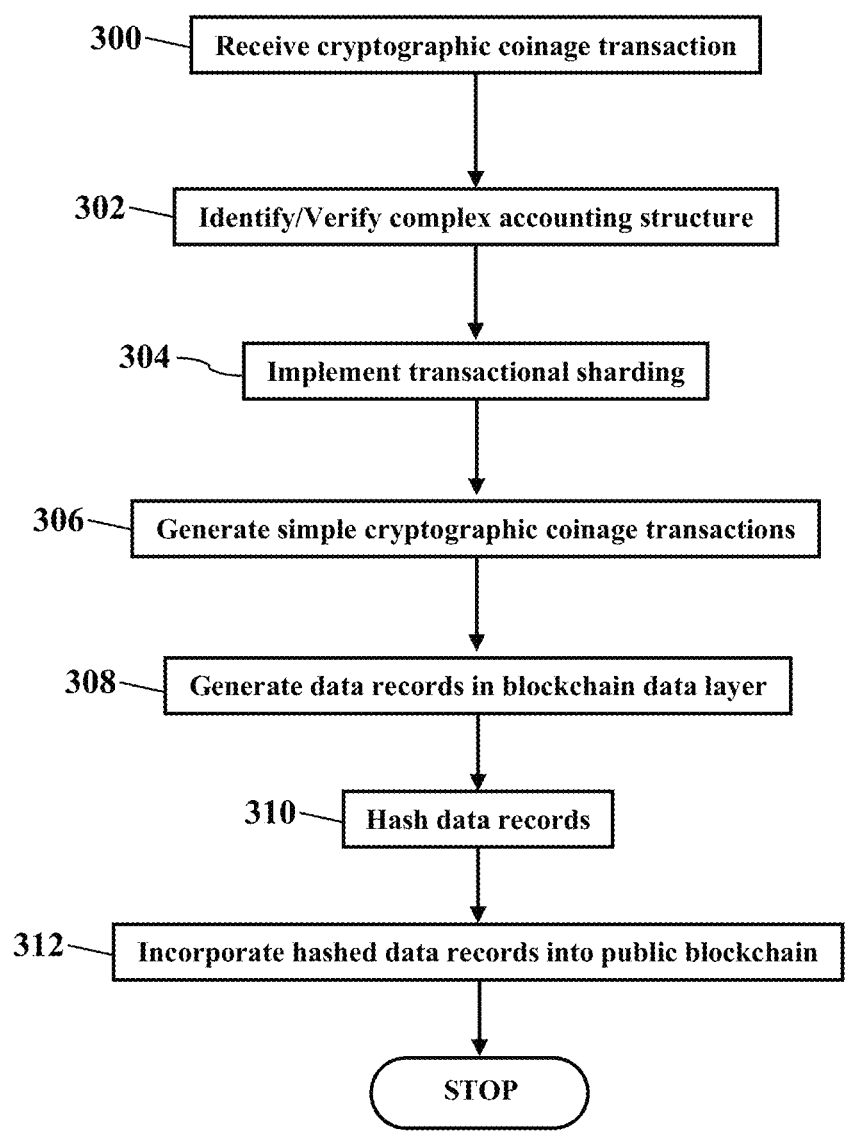
FIG. 32 is a flowchart illustrating a method or algorithm for the transactional sharding, according to exemplary embodiments.

FIG. 32 is a flowchart illustrating a method or algorithm for the transactional sharding 20, according to exemplary embodiments. The sharding server 34 may receive the complex cryptographic coinage transaction 24 (Block 300), identify and/or verify the complex accounting structure 28 (Block 302), and implement the transactional sharding 20 (Block 304). The multiple, simple cryptographic coinage transactions 26 are generated (Block 306). The data records 192 in the blockchain data layer 194 may be generated (Block 308). The data records 192 may be cryptographically hashed (Block 310) and published in the public blockchain 204 (Block 312).

Figure 33:
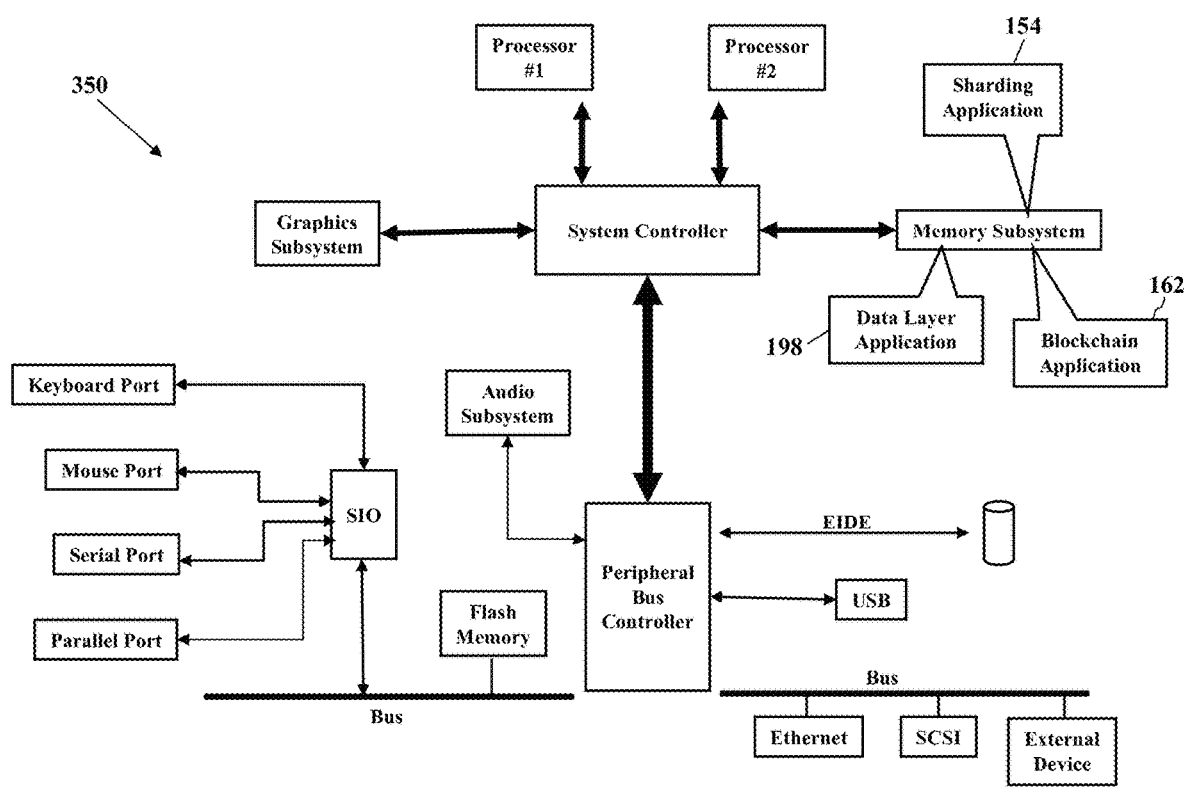
FIGS. 33-34 depict still more operating environments for additional aspects of the exemplary embodiments.

FIG. 33 is a schematic illustrating still more exemplary embodiments. FIG. 33 is a more detailed diagram illustrating a processor-controlled device 350. As earlier paragraphs explained, the sharding application 154, the blockchain application 162, and/or the data layer application 198 may partially or entirely operate in any mobile or stationary processor-controlled device. FIG. 33, then, illustrates the sharding application 154, the blockchain application 162, and/or the data layer application 198 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 34:
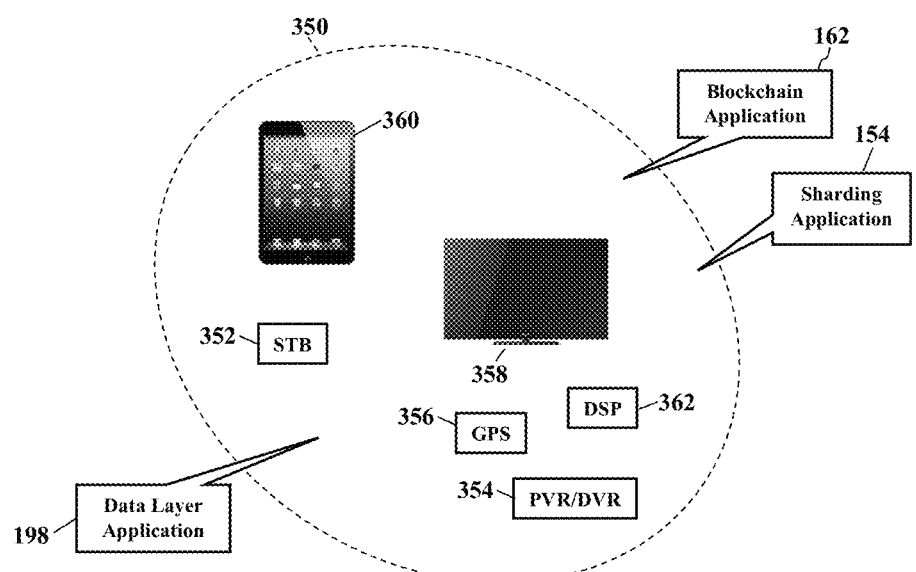

FIG. 34 depicts other possible operating environments for additional aspects of the exemplary embodiments. FIG. 34 illustrates the sharding application 154, the blockchain application 162, and/or the data layer application 198 operating within various other processor-controlled devices 350. FIG. 34, for example, illustrates that the sharding application 154, the blockchain application 162, and/or the data layer application 198 may entirely or partially operate within a set-top box ("STB") or other media player (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for the transaction sharding 22 in the blockchain environment 22, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A non-transitory memory device storing instructions that, when executed by a hardware processor of a sharding server in a sharded blockchain, perform operations, the operations comprising:
   receiving, by the sharding server, a blockchain transaction, wherein the sharded blockchain includes a plurality of blockchain shards configured to process different sets of simple transactions;
   determining, by the sharding server, that the received blockchain transaction is a complex transaction;
   transactionally sharding, by the sharding server, the complex transaction into a plurality of simple transactions, each simple transaction being one of
      (i) a debit transaction specifying a temporary account address on the sharded blockchain and an input account address on the sharded blockchain, and
      (ii) a deposit transaction specifying the temporary account address on the sharded blockchain and an output account address on the sharded blockchain;
   assigning, by the sharding server, each simple transaction of the plurality of simple transactions to a corresponding blockchain shard of the plurality of blockchain shards;
   transmitting, by the sharding server, each debit transaction of the plurality of simple transactions to the debit transaction's corresponding blockchain shard for debit processing;
   determining that all debit transactions of the plurality of simple transactions are processed successfully; and
   transmitting each deposit transaction of the plurality of simple transactions to the deposit transaction's corresponding blockchain shard for credit processing.

2. The non-transitory memory device of claim 1, wherein the operations further comprise recording the plurality of simple transactions to the sharded blockchain.

3. The non-transitory memory device of claim 1, wherein the operations further comprise transacting a cryptocoinage.

4. The non-transitory memory device of claim 1, wherein, following determining that the received blockchain transaction is a complex transaction, a cryptographic hold is placed against at least one of the blockchain input account addresses associated with the debit transactions of the plurality of simple transactions, and wherein the cryptographic hold expires after a predetermined time.

5. A system comprising a sharding server in a sharded blockchain, the sharding server including: a hardware processor; and a memory device storing instructions that, when executed by the hardware processor of the sharding server, perform operations, the operations comprising:
  receiving, by the sharding server, a blockchain transaction, wherein the sharded blockchain includes a plurality of blockchain shards configured to process different sets of simple transactions;
  determining, by the sharding server, that the received blockchain transaction is a complex transaction;
  transactionally sharding, by the sharding server, the complex transaction into a plurality of simple transactions, each simple transaction being one of
    (i) a debit transaction specifying a temporary account address on the sharded blockchain and an input account address on the sharded blockchain, and
    (ii) a deposit transaction specifying the temporary account address on the sharded blockchain and an output account address on the sharded blockchain;
  assigning, by the sharding server, each simple transaction of the plurality of simple transactions to a corresponding blockchain shard of the plurality of blockchain shards;
  transmitting, by the sharding server, each debit transaction of the plurality of simple transactions to the debit transaction's corresponding blockchain shard for debit processing;
  determining that all debit transactions of the plurality of simple transactions are processed successfully; and
  transmitting each deposit transaction of the plurality of simple transactions to the deposit transaction's corresponding blockchain shard for credit processing.

6. The system of claim 5, wherein the operations further comprise recording the plurality of simple transactions to the sharded blockchain.

7. The system of claim 5, wherein the operations further comprise transacting a cryptocoinage.

8. The system of claim 5, wherein, following determining that the blockchain transaction is a complex transaction, a cryptographic hold is placed against at least one of the blockchain input account addresses associated with the debit transactions of the plurality of simple transactions, and wherein the cryptographic hold expires after a predetermined time.

9. A method comprising:
  receiving, by a sharding server in a sharded blockchain, a blockchain transaction, wherein the sharded blockchain includes a plurality of blockchain shards configured to process different sets of simple transactions;
  determining, by the sharding server, that the received blockchain transaction is a complex transaction;
  transactionally sharding, by the sharding server, the complex transaction into a plurality of simple transactions, each simple transaction being one of
    (i) a debit transaction specifying a temporary account address on the sharded blockchain and an input account address on the sharded blockchain, and
    (ii) a deposit transaction specifying the temporary account address on the sharded blockchain and an output account address on the sharded blockchain;
  assigning, by the sharding server, each simple transaction of the plurality of simple transactions to a corresponding blockchain shard of the plurality of blockchain shards;
  transmitting, by the sharding server, each debit transaction of the plurality of simple transactions to the debit transaction's corresponding blockchain shard for debit processing;
  determining that all debit transactions of the plurality of simple transactions are processed successfully; and
  transmitting each deposit transaction of the plurality of simple transactions, to the deposit transaction's corresponding blockchain shard for credit processing.

10. The method of claim 9, wherein the operations further comprise recording the plurality of simple transactions to the sharded blockchain.

11. The method of claim 9, wherein the operations further comprise transacting a cryptocoinage.

12. The method of claim 9, wherein, following determining that the blockchain transaction is a complex transaction, a cryptographic hold is placed against at least one of the blockchain input account addresses associated with the debit transactions of the plurality of simple transactions, and wherein the cryptographic hold expires after a predetermined time.

* * * * *